United States Patent
Horiguchi et al.

(10) Patent No.: US 7,917,110 B2
(45) Date of Patent: Mar. 29, 2011

(54) COGNITIVE RADIO SYSTEM

(75) Inventors: Tomoya Horiguchi, Inagi (JP); Hiroshi Yoshida, Yokohama (JP); Tazuko Tomioka, Kawasaki (JP); Katsuya Nonin, Kawasaki (JP); Ren Sakata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 735 days.

(21) Appl. No.: 11/790,855

(22) Filed: Apr. 27, 2007

(65) Prior Publication Data

US 2007/0253394 A1 Nov. 1, 2007

(30) Foreign Application Priority Data

Apr. 28, 2006 (JP) ................ P 2006-126949

(51) Int. Cl.
*H04B 1/18* (2006.01)
(52) U.S. Cl. ............... 455/164.1; 455/161.1; 455/150.1
(58) Field of Classification Search .................. 455/424, 455/164.1, 32, 77, 125, 145, 160.1, 150.1, 455/179.1, 188.1
See application file for complete search history.

(56) References Cited

U.S. PATENT DOCUMENTS

| | | | | |
|---|---|---|---|---|
| 5,276,626 A * | 1/1994 | Ihara et al. | .................... | 701/224 |
| 5,280,630 A * | 1/1994 | Wang | ........................ | 455/452.2 |
| 5,437,054 A * | 7/1995 | Rappaport et al. | ............ | 455/447 |
| 5,511,072 A * | 4/1996 | Delprat | ........................ | 370/336 |
| 5,898,382 A * | 4/1999 | Treatch | ........................ | 340/2.71 |
| 6,219,554 B1 * | 4/2001 | Eswara et al. | ............. | 455/452.1 |
| 6,845,241 B2 * | 1/2005 | Edlund et al. | ............... | 455/456.1 |
| 6,882,851 B2 * | 4/2005 | Sugar et al. | .................... | 455/454 |
| 7,065,446 B2 * | 6/2006 | Chou | ............................. | 701/207 |
| 7,257,414 B2 * | 8/2007 | Spain et al. | ................ | 455/456.1 |
| 7,440,848 B2 * | 10/2008 | Anderson | ...................... | 701/207 |
| 2001/0016496 A1 * | 8/2001 | Lee | ............................... | 455/450 |
| 2002/0055817 A1 * | 5/2002 | Chou | ............................ | 701/207 |
| 2002/0128019 A1 * | 9/2002 | Ben-Yair et al. | .............. | 455/456 |
| 2004/0207555 A1 * | 10/2004 | Eckenroth et al. | ........... | 342/418 |
| 2004/0219940 A1 * | 11/2004 | Kong et al. | .................... | 455/518 |
| 2005/0163302 A1 * | 7/2005 | Mock et al. | .............. | 379/211.02 |
| 2006/0034336 A1 * | 2/2006 | Huh et al. | ..................... | 370/498 |
| 2006/0084444 A1 * | 4/2006 | Kossi et al. | .................... | 455/450 |
| 2007/0087763 A1 * | 4/2007 | Budampati et al. | ........ | 455/456.5 |
| 2007/0091998 A1 * | 4/2007 | Woo et al. | ................ | 375/240.02 |
| 2007/0210957 A1 * | 9/2007 | Brodie et al. | ............ | 342/357.06 |

FOREIGN PATENT DOCUMENTS

| | | |
|---|---|---|
| JP | 2000-196967 | 7/2000 |
| JP | 3583962 | 8/2004 |

* cited by examiner

*Primary Examiner* — Kent Chang
*Assistant Examiner* — Ronald Eisner
(74) *Attorney, Agent, or Firm* — Kimble Intellectual Property Law, PLLC

(57) ABSTRACT

A cognitive radio system includes: a state detecting device that scans a frequency band allocated to another radio system than the cognitive radio system to detect a first use-state of the frequency band; a first server including a first gathering unit that receives first information relating to the first use-state and a second gathering unit; a second server that stores a second use-state of the frequency band allocated to the other radio system, the second server configured to provide second information relating to the second use-state to the second gathering unit; and a notifying unit that notifies a terminal device in the cognitive radio system of information of an available channel based on the first information and the second information.

2 Claims, 30 Drawing Sheets

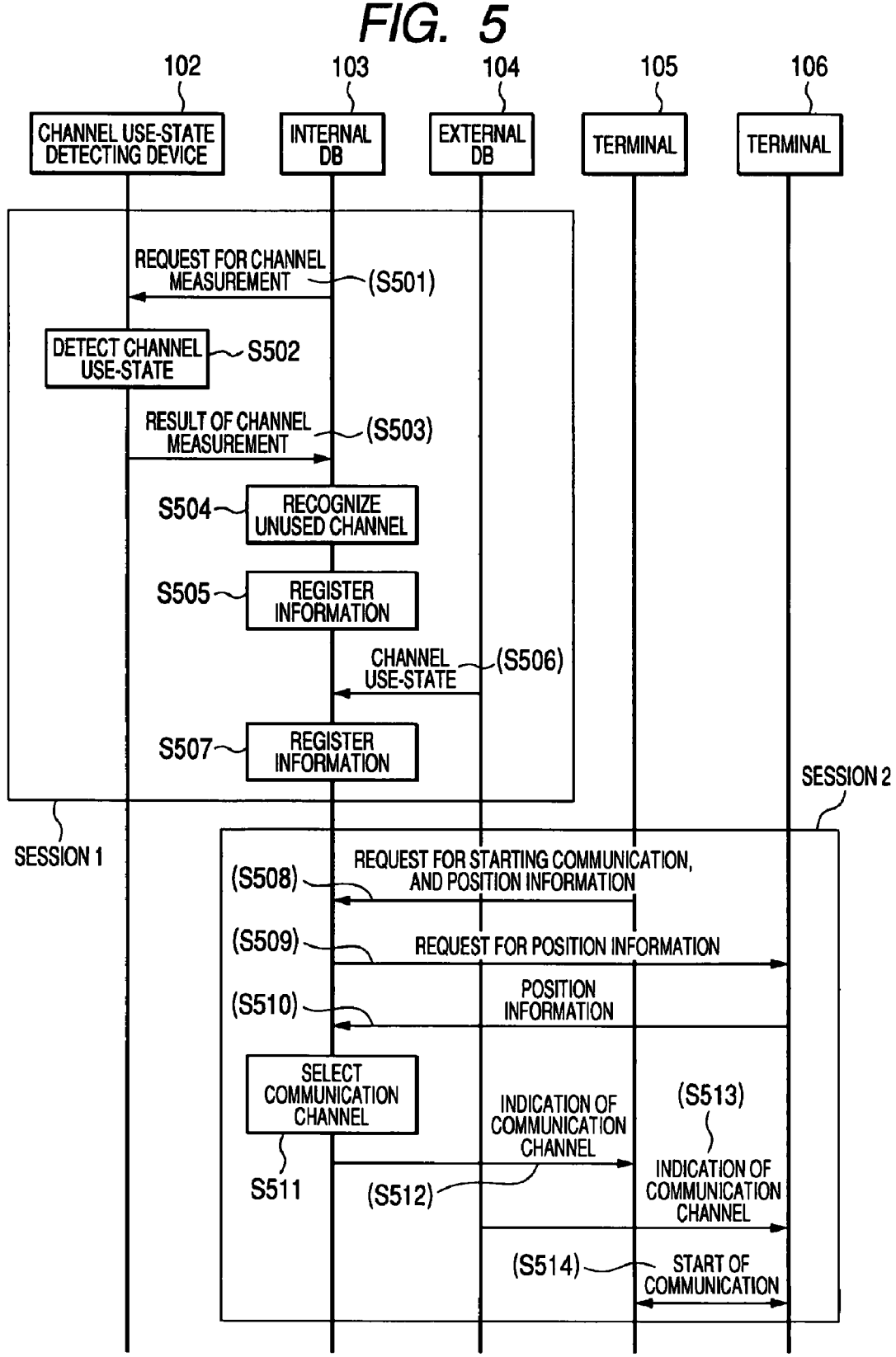

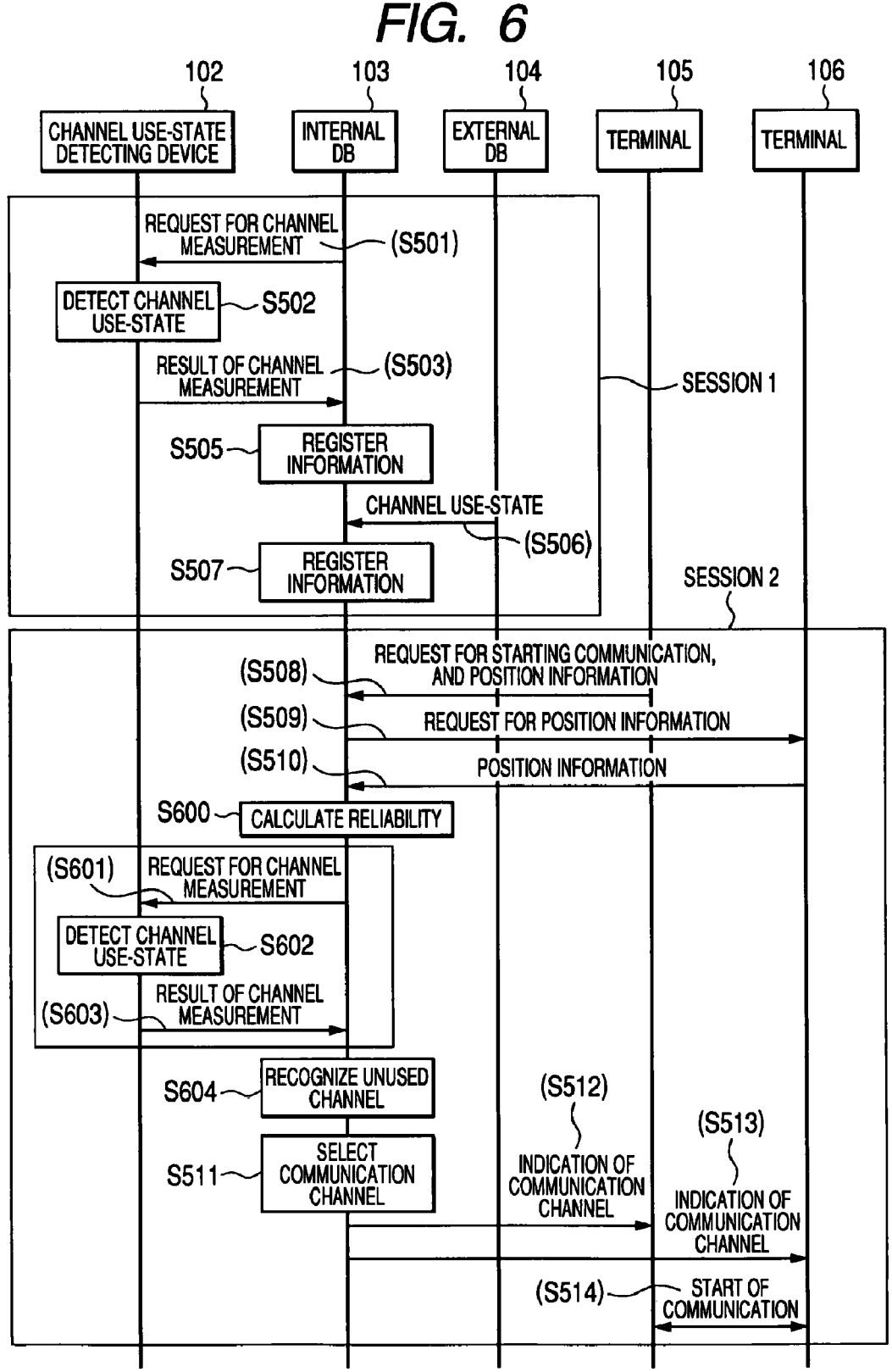

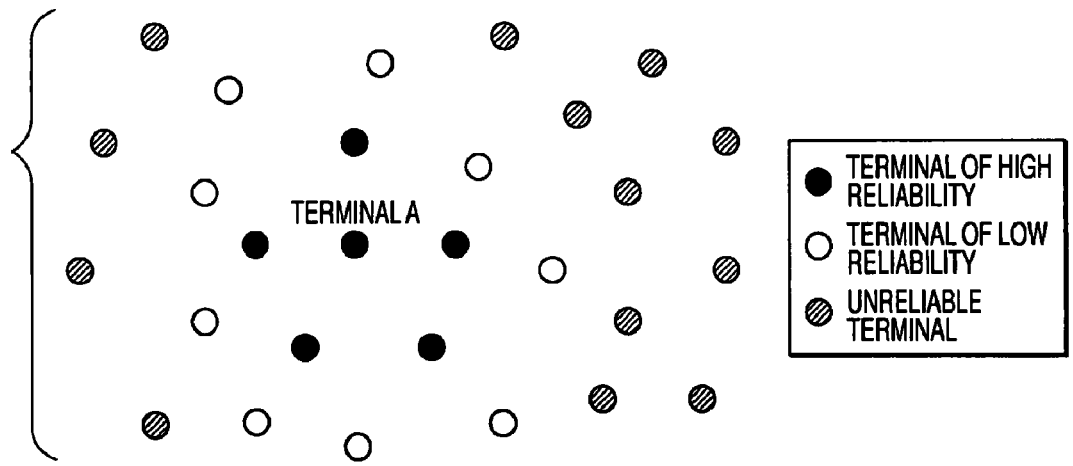
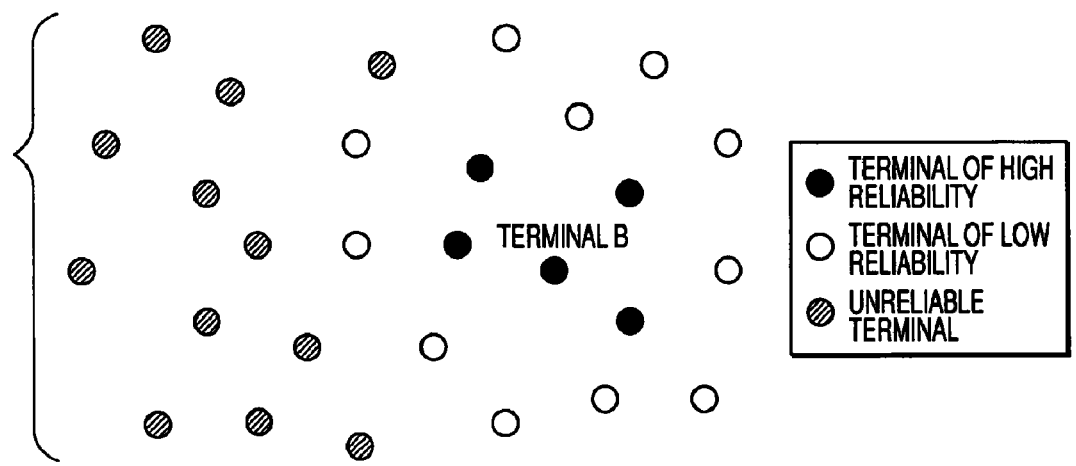
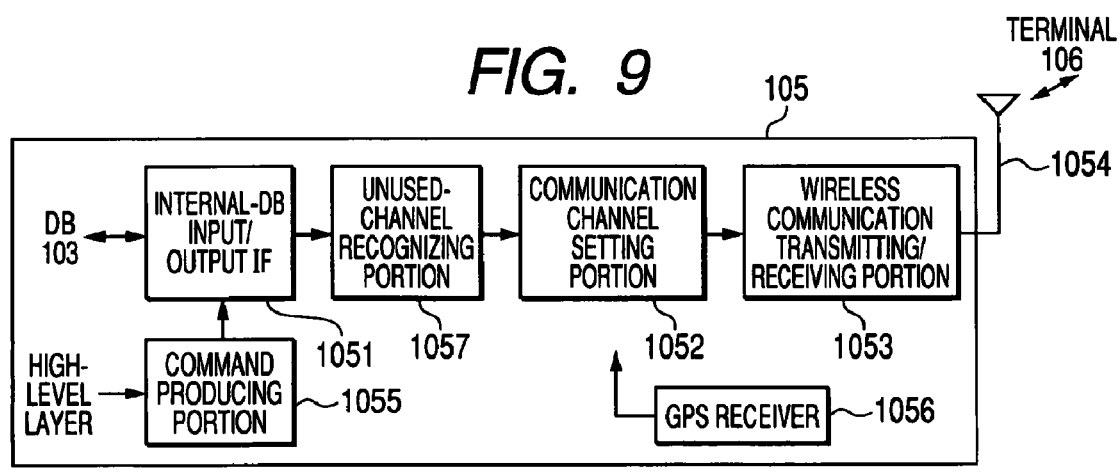

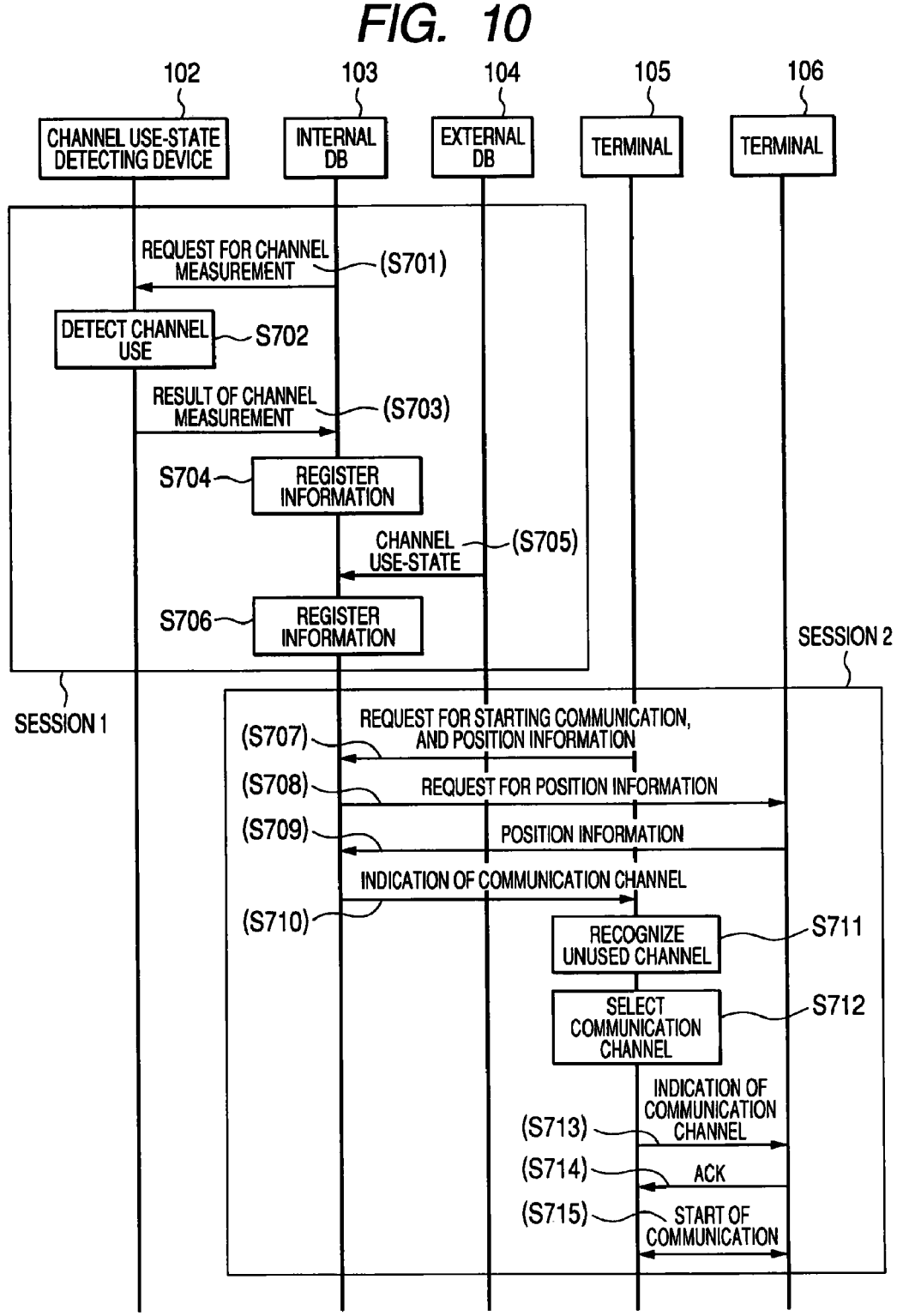

| POSITION | FREQUENCY BAND | STATE | INFORMATION SOURCE |
|---|---|---|---|
| N x01, E y01 | f01 MHz | TV TRANSMISSION | TV 224 |
| N x00, E y00 | f01 MHz | TV TRANSMISSION | DB 202 |
| N x00, E y00 | f03 MHz | TV TRANSMISSION | DB 202 |
| N x00, E y00 | f04 MHz | TV TRANSMISSION | DB 202 |
| N x00, E y00 | f06 MHz | TV TRANSMISSION | DB 202 |
| N x02, E y02 | f02 MHz | UNUSED BAND | ST 226 |
| N x02, E y02 | f07 MHz | UNUSED BAND | ST 226 |
| N x03, E y03 | f05 MHz | INTERFERENCE EXISTS | ST 227 |
| N x03, E y03 | f07 MHz | INTERFERENCE EXISTS | ST 227 |
| N x04, E y04 | f05 MHz | CR COMMUNICATION | DB 202 |
| N x05, E y05 | f03 MHz | TV RECEPTION | DB 202 |

| POSITION | FREQUENCY BAND | STATE | INFORMATION SOURCE | UPDATION TIME |
|---|---|---|---|---|
| N x01, E y01 | f01 MHz | TV TRANSMISSION | TV 224 | 12:10:01.00 |
| N x00, E y00 | f01 MHz | TV TRANSMISSION | DB 202 | 03:00:00.00 |
| N x00, E y00 | f03 MHz | TV TRANSMISSION | DB 202 | 03:00:00.00 |
| N x00, E y00 | f04 MHz | TV TRANSMISSION | DB 202 | 03:00:00.00 |
| N x00, E y00 | f06 MHz | TV TRANSMISSION | DB 202 | 03:00:00.00 |
| N x02, E y02 | f02 MHz | -60dBm | ST 226 | 12:21:48.20 |
| N x02, E y02 | f07 MHz | -61dBm | ST 226 | 12:21:48.20 |
| N x03, E y03 | f05 MHz | -20dBm | ST 227 | 12:21:49.20 |
| N x03, E y03 | f07 MHz | -68dBm | ST 227 | 12:21:49.20 |
| N x04, E y04 | f05 MHz | CR COMMUNICATION | DB 202 | 12:20:11.00 |
| N x05, E y05 | f03 MHz | TV RECEPTION | DB 202 | 12:20:11.00 |

16A: rows with ST 226
16B: rows with ST 227

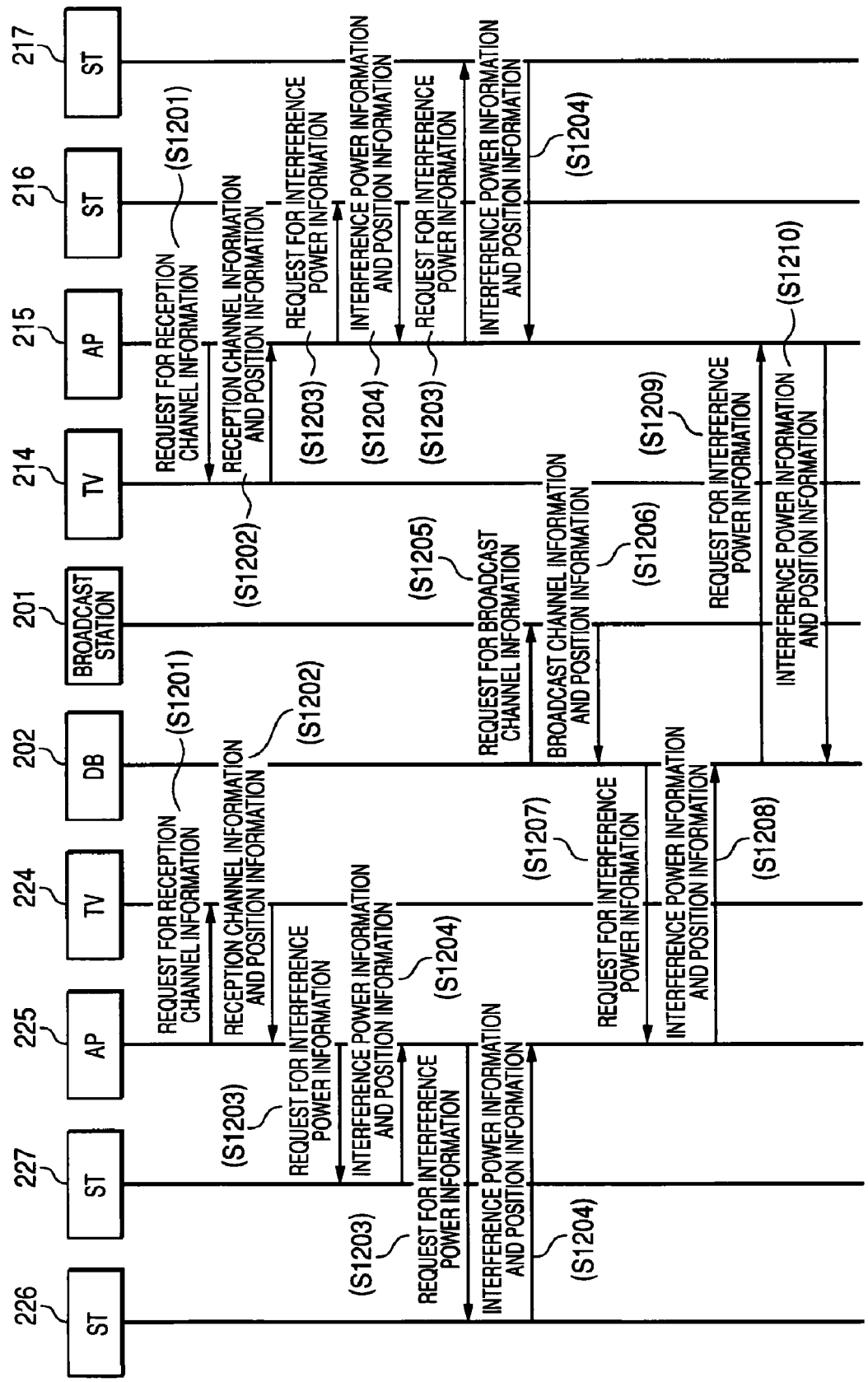

| POSITION | FREQUENCY BAND | STATE | INFORMATION SOURCE |
|---|---|---|---|
| N x01, E y01 | f01 MHz | TV RECEPTION | AP 225 |
| N x05, E y05 | f03 MHz | TV RECEPTION | AP 215 |
| N x00, E y00 | f01 MHz | TV TRANSMISSION | TV BROADCAST STATION 201 |
| N x00, E y00 | f03 MHz | TV TRANSMISSION | TV BROADCAST STATION 201 |
| N x00, E y00 | f04 MHz | TV TRANSMISSION | TV BROADCAST STATION 201 |
| N x00, E y00 | f06 MHz | TV TRANSMISSION | TV BROADCAST STATION 201 |
| N x03, E y03 | f05 MHz | INTERFERENCE EXISTS | AP 225 |
| N x03, E y03 | f07 MHz | INTERFERENCE EXISTS | AP 225 |
| N x04, E y04 | f05 MHz | CR COMMUNICATION | AP 215 |

FIG. 19
DB 202

| POSITION | FREQUENCY BAND | STATE | INFORMATION SOURCE | UPDATION TIME |
|---|---|---|---|---|
| N x01, E y01 | f01 MHz | TV RECEPTION | AP 225 | 12:10:01.00 |
| N x05, E y05 | f03 MHz | TV RECEPTION | AP 215 | 12:20:11.00 |
| N x00, E y00 | f01 MHz | TV TRANSMISSION | TV BROADCAST STATION 201 | 03:00:00.00 |
| N x00, E y00 | f03 MHz | TV TRANSMISSION | TV BROADCAST STATION 201 | 03:00:00.00 |
| N x00, E y00 | f04 MHz | TV TRANSMISSION | TV BROADCAST STATION 201 | 03:00:00.00 |
| N x00, E y00 | f06 MHz | TV TRANSMISSION | TV BROADCAST STATION 201 | 03:00:00.00 |
| N x02, E y02 | f02 MHz | -60dBm | AP 225 | 12:21:48.20 |
| N x02, E y02 | f07 MHz | -61dBm | AP 225 | 12:21:48.20 |
| N x03, E y03 | f05 MHz | -20dBm | AP 225 | 12:21:49.20 |
| N x03, E y03 | f07 MHz | -18dBm | AP 225 | 12:21:49.20 |
| N x04, E y04 | f05 MHz | CR COMMUNICATION | AP 215 | 12:20:11.00 |
| N x06, E y06 | f02 MHz | -60dBm | AP 215 | 12:21:48.10 |
| N x06, E y06 | f07 MHz | -61fdBm | AP 215 | 12:21:48.10 |

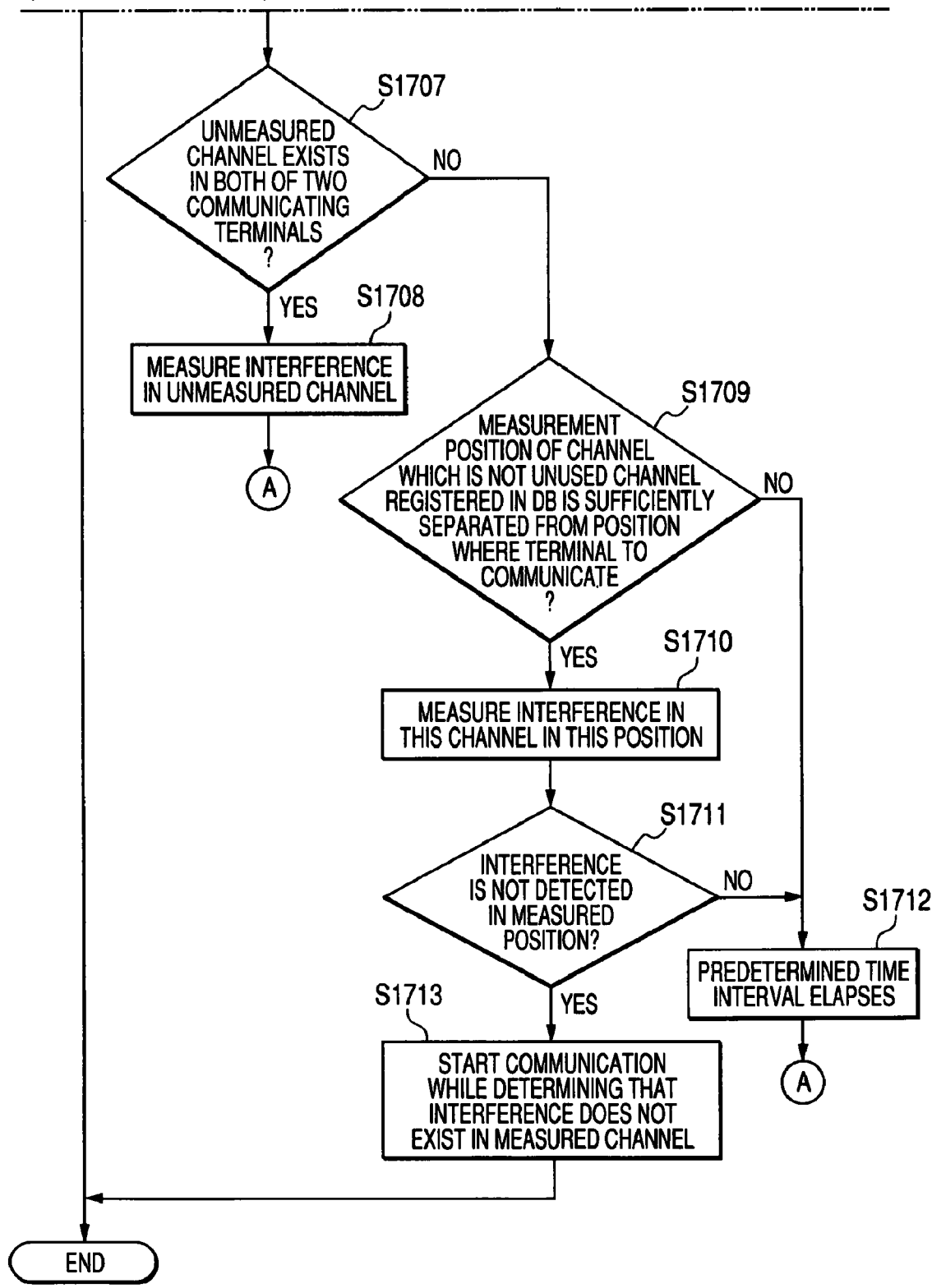

FIG. 28

TERMINAL 504 DB

| POSITION | FREQUENCY BAND | STATE | INFORMATION SOURCE |
|---|---|---|---|
| N x03, E y03 | f02 MHz | RADIO ASTRONOMY MEASUREMENT | RADIO ASTRONOMY |
| N x01, E y01 | f01 MHz | UNUSED BAND | TERMINAL 504 |
| N x01, E y01 | f02 MHz | UNUSED BAND | TERMINAL 504 |
| N x01, E y01 | f03 MHz | UNUSED BAND | TERMINAL 504 |
| N x01, E y01 | f04 MHz | INTERFERENCE EXISTS | TERMINAL 504 |

FIG. 29

TERMINAL 505 DB

| POSITION | FREQUENCY BAND | STATE | INFORMATION SOURCE |
|---|---|---|---|
| N x03, E y03 | f02 MHz | RADIO ASTRONOMY MEASUREMENT | RADIO ASTRONOMY |
| N x02, E y02 | f01 MHz | UNUSED BAND | TERMINAL 503 |
| N x02, E y02 | f02 MHz | UNUSED BAND | TERMINAL 503 |
| N x02, E y02 | f03 MHz | UNUSED BAND | TERMINAL 503 |
| N x02, E y02 | f04 MHz | UNUSED BAND | TERMINAL 503 |

FIG. 30

BASE STATION 506 DB

| POSITION | FREQUENCY BAND | STATE | INFORMATION SOURCE |
|---|---|---|---|
| N x03, E y03 | f02 MHz | RADIO ASTRONOMY MEASUREMENT | RADIO ASTRONOMY |
| N x01, E y01 | f01 MHz | UNUSED BAND | TERMINAL 504 |
| N x01, E y01 | f02 MHz | UNUSED BAND | TERMINAL 504 |
| N x01, E y01 | f03 MHz | UNUSED BAND | TERMINAL 504 |
| N x01, E y01 | f04 MHz | INTERFERENCE EXISTS | TERMINAL 504 |
| N x02, E y02 | f01 MHz | UNUSED BAND | TERMINAL 503 |
| N x02, E y02 | f02 MHz | UNUSED BAND | TERMINAL 503 |
| N x02, E y02 | f03 MHz | UNUSED BAND | TERMINAL 503 |
| N x02, E y02 | f04 MHz | UNUSED BAND | TERMINAL 503 |

| POSITION | FREQUENCY BAND | STATE | INFORMATION SOURCE |
|---|---|---|---|
| N x03, E y03 | f02 MHz | RADIO ASTRONOMY MEASUREMENT | RADIO ASTRONOMY |
| N x01, E y01 | f01 MHz | UNUSED BAND | BASE STATION 506 |
| N x01, E y01 | f02 MHz | UNUSED BAND | BASE STATION 506 |
| N x01, E y01 | f03 MHz | UNUSED BAND | BASE STATION 506 |
| N x01, E y01 | f04 MHz | INTERFERENCE EXISTS | BASE STATION 506 |
| N x02, E y02 | f01 MHz | UNUSED BAND | BASE STATION 506 |
| N x02, E y02 | f02 MHz | UNUSED BAND | BASE STATION 506 |
| N x02, E y02 | f03 MHz | UNUSED BAND | BASE STATION 506 |
| N x02, E y02 | f04 MHz | UNUSED BAND | BASE STATION 506 |
| N x04, E y04 | f01 MHz | UNUSED BAND | BASE STATION 507 |
| N x04, E y04 | f02 MHz | UNUSED BAND | BASE STATION 507 |
| N x04, E y04 | f03 MHz | UNUSED BAND | BASE STATION 507 |
| N x04, E y04 | f04 MHz | UNUSED BAND | BASE STATION 507 |

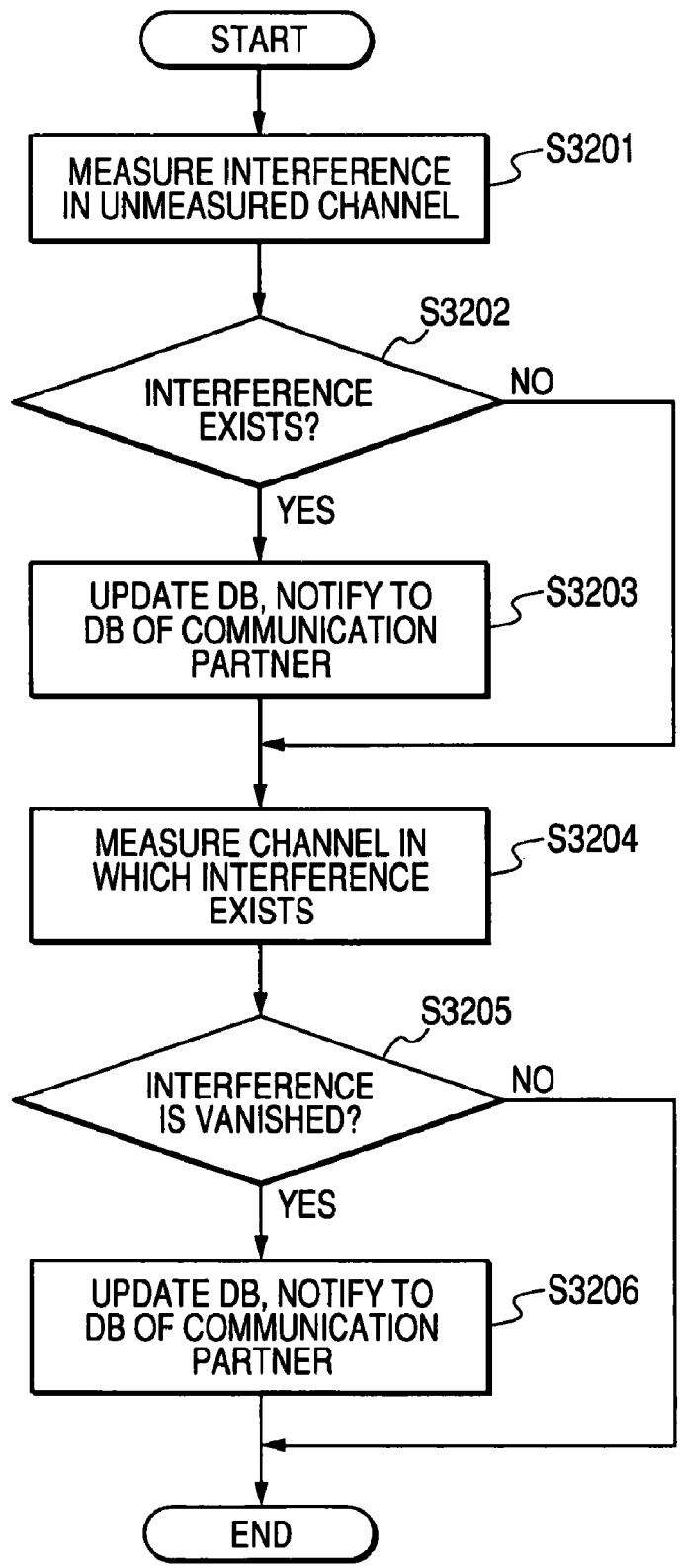

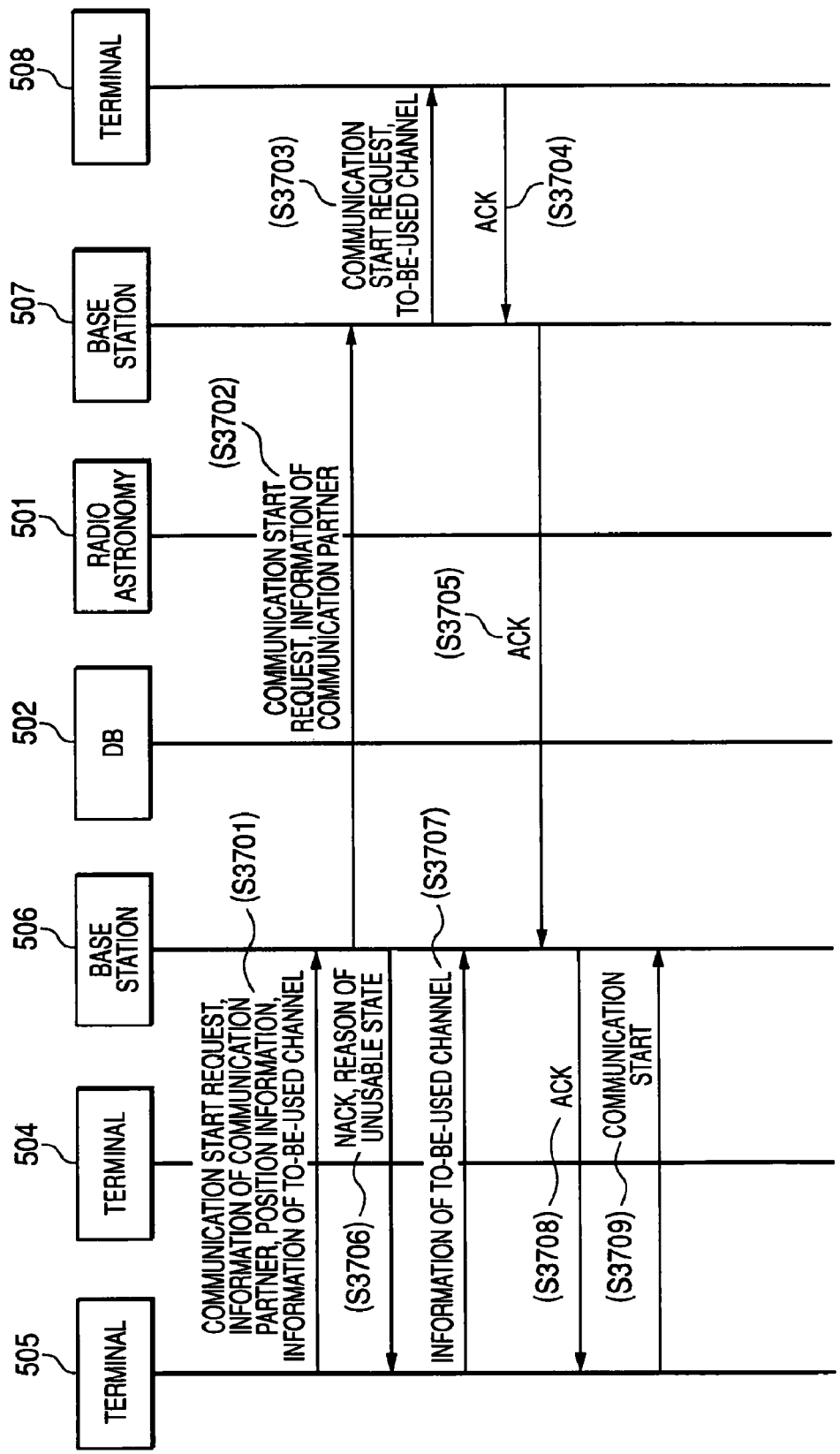

COGNITIVE RADIO SYSTEM

CROSS-REFERENCE TO RELATED APPLICATIONS

This application is based upon and claims the benefit of priority from the prior Japanese Patent Applications No. 2006-126949, filed on Apr. 28, 2006; the entire contents of which are incorporate herein by reference.

BACKGROUND

1. Field

The present invention relates to a cognitive radio system which uses a frequency band licensed to a particular system such as a broadcasting system, only at a time and place which are not used by the system.

2. Related Art

In order to cope with tightness of frequency resources, a study for a system called "cognitive radio" as a next-generation mobile communication system has been started. The basic concept of cognitive radio technology is that a usable frequency band is scanned to detect a use-state of a wireless channel (frequency), and a usable frequency band is borrowed. Of course, in a radio system in which cognitive radio is used (hereafter, such a system is referred to as "cognitive radio system"), a wireless channel have to be shared so as not to interfere with existing radio systems such as a broadcasting system, a radar system, and a radio astronomy observing system.

Japanese Patent No. 3,583,962 discloses a technique of sharing a frequency wireless channel for a television broadcast as a radio system.

In Japanese Patent No. 3,583,962, only a television broadcast is considered as an existing licensed radio system. In a cognitive radio system, it is expected that each wireless terminal device having a function of cognitive radio detects a wireless-channel use-state. However, there are a lot of information which cannot be obtained by a wireless terminal device alone, such as wireless-channel use-states of radio astronomy and a television receiver which perform only reception.

In the case where wireless terminal devices of cognitive radio which are separated from each other by 100 m communicate with each other, for example, other wireless terminal devices which mutually perform transmission and reception through a distance that is very shorter than 50 m, e.g., 3 m may exist at intermediate positions which are separated from the wireless terminal devices by about 50 m. There is a possibility in which radio waves from the other wireless terminal devices cannot be detected by the wireless terminal devices of cognitive radio which are separated by 50 m. When the wireless terminal devices fail to aware the radio waves and start communication with using a frequency which is used by the other wireless terminal devices, the communication obstructs the communication between the other wireless terminal devices. Therefore, a frequency by which a wireless terminal device of cognitive radio starts communication have to be determined while the terminal device knows as correctly as possible use-states of frequencies (wireless channels) in the radio-wave arrival range. However, such use-states are hardly known by a wireless terminal device alone.

SUMMARY

According to an aspect of the invention, a cognitive radio system can obtain a wireless-channel use-state that cannot be grasped by a wireless terminal device of cognitive radio alone, and which does not interfere with an existing radio system.

According to an aspect of the invention, there is provided a cognitive radio system including: a state detecting device that scans a frequency band allocated to another radio system than the cognitive radio system to detect a first use-state of the frequency band; a first server including a first gathering unit that receives first information relating to the first use-state and a second gathering unit; a second server that stores a second use-state of the frequency band allocated to the other radio system, the second server configured to provide second information relating to the second use-state to the second gathering unit; and a notifying unit that notifies a terminal device in the cognitive radio system of information of an available channel based on the first information and the second information.

BRIEF DESCRIPTION OF THE DRAWINGS

In the accompanying drawings:

FIG. 5 is a sequence diagram illustrating operations of devices of a cognitive radio system of the first embodiment of the invention;

FIG. 6 is a sequence diagram showing an example in which the reliability of measured channel use-state information measured by the internal database is calculated, and an unused channel is recognized by using information of a channel use-state in which the reliability is high;

FIG. 7 is a view illustrating an example of relationships between positions of terminals including functions of a channel use-state detecting device, and the reliability;

FIG. 8 is a view illustrating an example of relationships between positions of terminals including functions of the channel use-state detecting device, and the reliability;

FIG. 9 is a sequence diagram schematically showing the configurations of terminals in a second embodiment of the invention;

FIG. 10 is a sequence diagram showing an example of the process and message exchange in the second embodiment;

FIG. 15 is a view showing information stored in a database of the access point;

FIG. 16 is a view showing a modification of the information table shown in FIG. 15;

FIG. 17 is a sequence diagram showing an example of message exchanges which are conducted by databases for gathering wireless-channel use-state information;

FIG. 18 is a view showing information of use-states of frequency bands at a certain position among information held by a database, and information sources from which the information is obtained;

FIG. 19 is a view showing a modification of the information table shown in FIG. 18;

FIG. 28 is a view showing an example of wireless-channel use-state information in a database in the terminal;

FIG. 29 is a view showing an example of wireless-channel use-state information in a database in a terminal;

FIG. 30 is a view showing an example of wireless-channel use-state information in a database in a base station;

FIG. 31 is a view showing an example of wireless-channel use-state information stored in a local database;

FIG. 32 is a flowchart in the case where a terminal notifies a base station of a wireless-channel use-state in the fourth embodiment;

FIG. 37 is a sequence diagram showing an example of message exchanges in the case where the terminal starts communication.

DETAILED DESCRIPTION

Hereinafter, best embodiments of the invention will be described in detail with reference to the accompanying drawings.

First Embodiment

Figure 1:
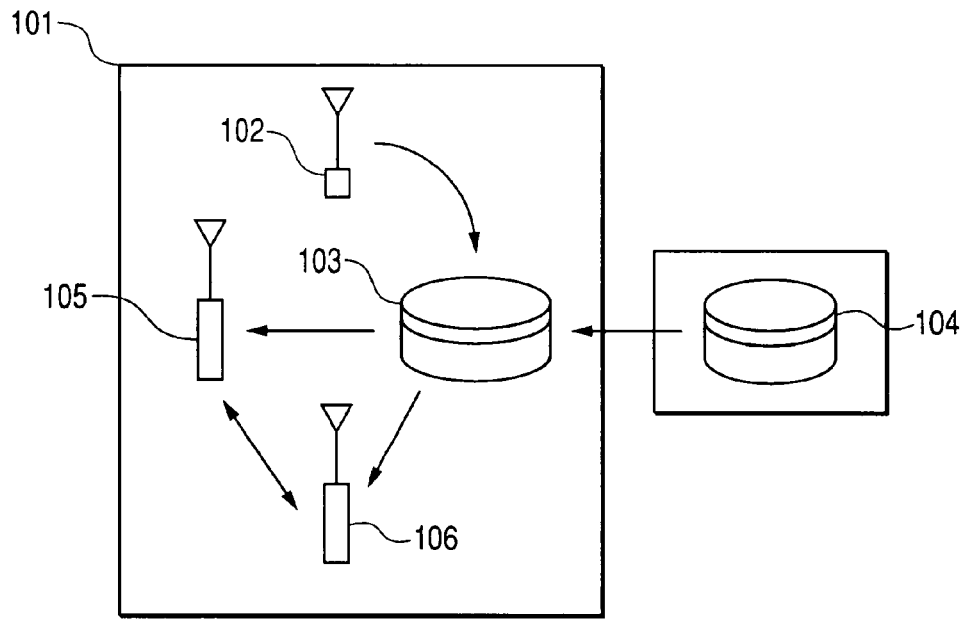
FIG. 1 is a diagram schematically showing the configuration of a cognitive radio system of a first embodiment of the invention.

FIG. 1 is a diagram schematically showing the configuration of a cognitive radio system of a first embodiment of the invention. The cognitive radio system comprises: a wireless communication system 101 including wireless terminal devices 105, 106 that communicate with each other; a wireless-channel use-state detecting device 102 (hereinafter, referred to as "detecting device 102") which detects the use-state of a wireless channel that can be used by the wireless terminal devices 105, 106; an internal wireless-channel use-state database device 103 (hereinafter, referred to as "internal DB 103"); and an external wireless-channel use-state database device 104 (hereinafter, referred to as "external DB 104") which stores wireless-channel use-states of frequency bands that are allocated as licensed channels to radio systems different from the wireless communication system 101 (for example, a police radio and an emergency radio which is used in a disaster situation).

Figure 2:
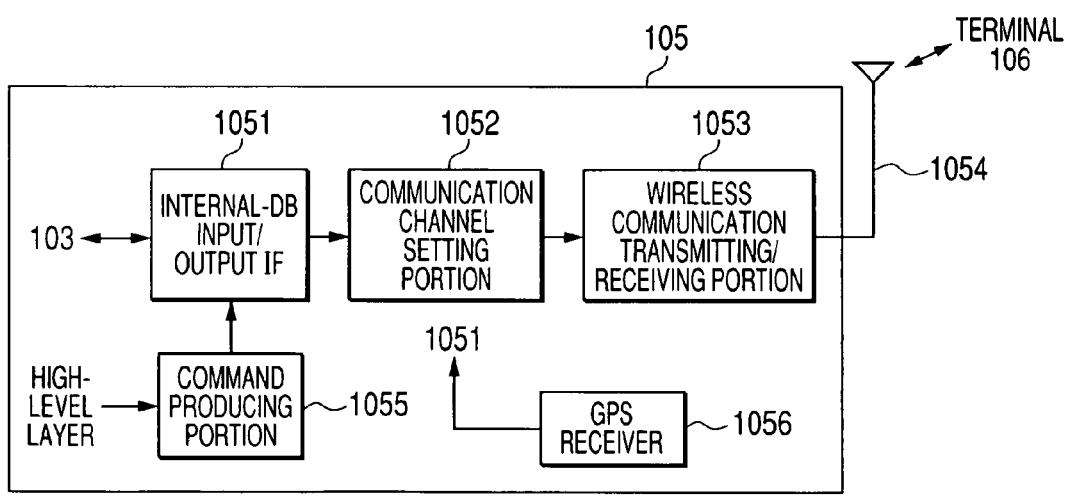
FIG. 2 is a diagram schematically showing the configuration of a wireless terminal device.

FIG. 2 is a diagram schematically showing the configuration of the wireless terminal device 105. The wireless terminal devices 105, 106 have the same configuration. The terminal 105 has a function of cognitive radio, and, in addition to a usual communication function, has the following functions. The terminal receives information which is supplied from the internal DB 103, and which relates to a use-state of a wireless channel, and performs communication while a wireless channel (communication channel) used in the communication is set by the terminal itself.

Referring to FIG. 2, the terminal 105 comprises: an internal-DB input/output interface 1051 which is an interface with the internal DB 103; a communication channel setting portion 1052 which sets a communication channel on the basis of the information which is received from the internal DB 103, and which relates to a wireless channel in an unused (not used) state; a wireless communication transmitting/receiving portion 1053 which modulates a signal to be transmitted through the set communication channel, and which demodulates a received signal; an antenna 1054 for transmission and reception; and a command producing portion 1055 which produces various commands based on instructions from a high-level layer. The internal-DB input/output interface 1051 is, for example, a wireless interface, and can communicate with the internal DB 103. The terminal 105 further comprises a GPS receiver 1056, and can measure its own position and notify the internal DB 103 of a result of the measurement through the internal-DB input/output interface 1051.

Figure 3:
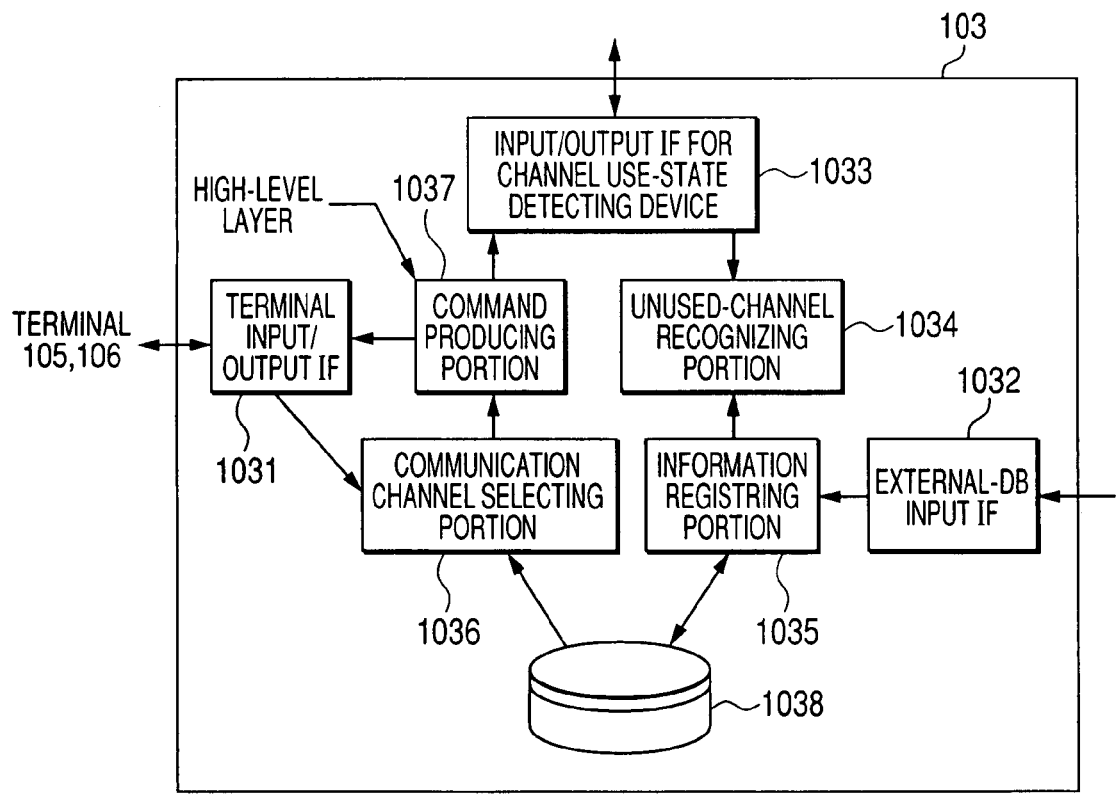
FIG. 3 is a diagram schematically showing functions of an internal database.

FIG. 3 is a diagram schematically showing the functions of the internal DB 103. The internal DB 103 can communicate with the terminal 105, the external DB 104, and the detecting device 102, and comprises interfaces 1031, 1032, 1033 with the devices. The internal DB 103 further comprises: an unused-channel recognizing portion 1034 which recognizes a wireless channel in an unused state on the basis of the wireless-channel use-state information that is supplied from the detecting device 102; an information registering portion 1035 which organizes information received from the external DB 104 and the unused-channel recognizing portion 1034, and which registers the organized information into a database portion 1038; a communication channel selecting portion 1036; and a command producing portion 1037 which produces various commands on the basis of instructions from the high-level layer.

Figure 4:
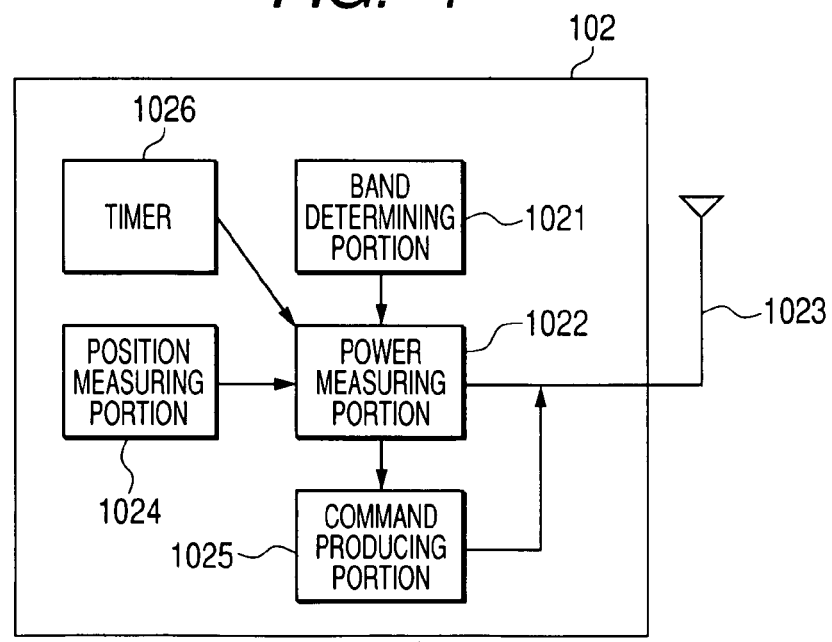
FIG. 4 is a diagram schematically showing functions of a detecting device.

FIG. 4 is a diagram schematically showing the functions of the detecting device 102. The detecting device 102 is connected with the internal DB 103 by wire or wireless, and, on the basis of a request from the internal DB 103, detects use-states of wireless channels (hereinafter, referred to as "licensed channels") which are licensed to existing radio systems that are in the periphery of the detecting device 102, such as a radar system and a broadcasting system.

Referring to FIG. 4, a band determining portion 1021 indicates information of a frequency band in which a use-state is to be detected, to a power measuring portion 1022. The power measuring portion 1022 receives instructions from the band determining portion 1021, and measures the power of a signal which is received through an antenna 1023. A position measuring portion 1024 is a GPS receiver or the like, and measures the position of the detecting device 102. In the case where the detecting device 102 is wirelessly connected with the internal DB 103, a command producing portion 1025 has functions of receiving the reception power measured by the power measuring portion 1022, and the own position information measured by the position measuring portion 1024, and supplying them to the internal DB 103 through the antenna 1023. A timer 1026 is used for turning ON/OFF the power measuring portion 1022 with a predetermined period, or for recording a time of the power measurement, a time period required for measurement, etc. The information which is supplied from the command producing portion 1025 to the internal DB 103 includes, in addition to the measured reception power and the position information of the detecting device 102, information of a measured frequency band, a measured band width, a measured time, a time period required for measurement, an antenna gain of the detecting device, the direction of a beam, etc.

Referring to FIG. 5, the operations of the above-described devices will be described.

FIG. 5 is a sequence diagram illustrating the operations of the devices. First, a session (session 1) to the time when the detection result of the detecting device 102 indicating a use-state of a wireless channel is registered in the internal DB 103 will be described.

First, the internal DB 103 transmits a signal requesting a measurement of the use-state of the licensed channel, from the command producing portion 1037 of the internal DB 103 to the detecting device 102 (step S501).

In response to the measurement request, the detecting device 102 detects the use-state of the licensed channel (step S502), and notifies the internal DB 103 of a result of the measurement (step S503). The use-state of the wireless channel includes, in addition to the reception power measured in the wireless channel to be measured and the position of the detecting device, the measured frequency band, the measured band width, the measured time, and the time period required for the measurement. The use-state may further include the antenna gain of the detecting device, the direction of a beam, etc. In the case where the measured signal has a certain degree of periodicity, the period of the measured signal, the length of a silent interval, the duty ratio, and the like may be included in the information to be notified to the internal DB 103. In the case where the existing radio system is a radar, for example, a radar signal has a periodicity of several milliseconds. In the case where the existing radio system is a television (TV) broadcasting system, it is said that a television broadcast signal has a day-scale periodicity. Such a period also may be notified to the internal DB 103.

In the internal DB 103, from the use-state of the wireless channel which is supplied through the interface portion 1033, the unused-channel recognizing portion 1034 recognizes whether the object wireless channel is an unused wireless channel or not (step S504). A region which is orthogonal to the existing communication in the frequency, time, space, and diffusion code domains, or a wireless channel in which transmission is enabled at a power producing interference at a degree that does not largely affect the existing communication is set as an unused wireless channel.

The interference at a degree that does not largely affect the existing communication in term of the frequency domain means interference which, in a region that is separated by insertion of a guard band in term of the frequency domain, does not affect the reception performance of the existing communication even when a sidelobe of a frequency spectrum which has been passed through a filter overlaps with the existing communication. The interference at a degree which does not largely affect the existing communication in term of the time domain means interference which, in a region that is separated by insertion of a guard interval in term of the time, does not affect the reception performance of the existing communication even when the region exceeds a guard band to overlap with the existing communication by multipath delay spread. The interference at a degree that does not largely affect the existing communication in term of the space domain means interference which, in communication that is performed between regions geographically separated from each other, does not affect the reception performance of the existing communication even when the communication is sufficiently attenuated by a propagation loss and a signal reaches a transmitter/receiver performing the existing communication. The interference at a degree that does not largely affect the existing communication in term of the diffusion code domain means interference which, although not a code that is completely orthogonal to the diffusion code performing the existing communication, less exerts an influence due to mutual correlation and does not affect the reception performance of the existing communication.

Specifically, a wireless channel in which interference equal to or more than thermal noise is not measured in the frequency, time, space, and diffusion code domains is set as an unused wireless channel. The interference amount $I_{n,f,t,c}$ of a terminal n in a frequency band f, a time slot t, and a diffusion code c is obtained by using following Expression (1)

$$I_{n,f,t,c} = \begin{cases} \sum_{m=0}^{M} [P_{m,f,s,c} \times Lp(|L_n - L_m|)] & n \notin \{m = 0, 1, \ldots, M-1\} \\ P_{n,f,t,c} & n \in \{m = 0, 1, \ldots, M-1\} \end{cases}$$

where $P_{m,f,t,c}$: reception power in the frequency band f, the time slot t, and the diffusion code c, measured by a detecting device m, M: number of detecting devices, $L_m$: position of a detecting device, $L_n$: position of a terminal, and $L_p$ ($|L_n-L_m|$): propagation loss with respect to distance $|L_n-L_m|$.

The reception power P is a value measured by the detecting device 102, and the number of the detecting device 102 is set to 1 in the embodiment. The position of the detecting device 1102 is a value measured by the position measuring portion 1024 disposed in the detecting device 102, the position of the terminal 105 is a value measured by the GPS receiver 1056 disposed in the terminal 105, and the propagation loss is a constant. The unused-channel recognizing portion 1034 of the internal DB 103 obtains the interference amount on the basis of the above-mentioned values. The unused-channel recognizing portion 1034 compares the obtained interference amount with a constant threshold corresponding to the noise power of the terminal, and, if the obtained interference amount is smaller than the threshold, determines that the wireless channel is in an unused state.

In the internal DB 103, the information registering portion 1035 organizes the information obtained from the detecting device 102, and performs registration (step S505). Here, the organization means a process in which, in the case where use-state information of a wireless channel having substantially same position information and the same frequency band is notified, information is overwritten with new information.

The internal DB 103 obtains the wireless-channel use-state from the external DB 104 (step S506). The information obtained from the external DB 104 is a use-state of a wireless channel which cannot be known by the internal DB 103, and includes a wireless-channel use-state of a frequency band which is used only in reception such as the case of a TV, a radar, and radio astronomy, and information of a frequency band the use of which is prohibited by law, and the like.

In the internal DB 103, the information registering portion 1035 organizes the information obtained from the external DB 104, and performs registration (step S507). The above sequence is session 1 to the time when the detection result of the detecting device 102 indicating the use-state of the wireless channel is registered in the internal DB 103.

Next, a session (session 2) to the time when the terminal 105 obtains information relating to the use-state of the wireless channel from the internal DB 103, and starts communication with the terminal 106 will be described.

When a request for communicating with the terminal 106 is generated in the terminal 105, the terminal 105 transmits a communication start request signal to the internal DB 103, and notifies of its own position information (step S508). The request signal is produced by the command producing portion 1055. The position information is sent on the request signal.

The internal DB 103 requests the terminal 106 to send position information (step S509). The terminal 106 notifies the internal DB 103 of its own position information (step S510).

The internal DB 103 selects the unused wireless channel recognized in step S504 as a communication wireless channel between the terminals 105, 106 (step S511). Among wireless channels which are recognized as unused wireless channels, however, a wireless channel which is set as "inhibition of transmission" or "inhibition of use" by the external DB 104 is not selected as a communication wireless channel. The internal DB 103 determines whether, among wireless channels recognized as unused wireless channels, a wireless channel which is set as "used" by the external DB 104 can be used as a communication channel in view of position information of the terminals 105, 106 or not. The internal DB obtains the positions of the terminals 105, 106 and the distances with respect to a used apparatus, obtains interference which may be received by the used apparatus, and, if the interference is approximately at a degree smaller than thermal noise, selects as a communication channel.

When the terminal n is in a frequency band f, the time slot t, and the diffusion code c, an estimated interference amount $I_{n,l,f,t,c}$ which may be received by a used apparatus 1 is obtained by using following Expression (2):

$$I_{n,1,f,t,c} = G_n(L_l - L_n) \times P_{n,f,t,c} \times Lp(|L_l - L_n|)$$

where $P_{n,f,t,c}$: transmission power which is transmitted by the terminal n in the frequency band f, the time slot t, and the diffusion code c, and $G_n (L_l - L_n)$: antenna gain in the terminal n with respect to the direction $(L_n - L_m)$.

The internal DB 103 notifies the terminals 105, 106 of the communication wireless channel selected in step S511 (steps S512, s513), and communication between the terminals is started by using the communication channel (step S514).

The terminal 105 previously notifies the internal DB 103 of a scheduled communication time, the interval of burst communications, the communication band, a require band width, a required bit rate, QoS (Quality of Service) information, the modulation system, etc. As a result, the internal DB 103 enables the detecting device 102 to perform setting of a communication channel in consideration of these sets of information, and unwasted detection of a channel use-state. When an expected communication time is registered in a database, for example, a waste of operation in which the detecting device 102 measures the use-state of a wireless channel that is known to be in communication is prevented from being performed. When the period of a burst communication signal is registered in the database portion 1038, it is possible to easily recognize a temporally unused wireless channel among in recognition of an unused wireless channel on another communication.

When the frequency band is registered in the database portion 1038, it is possible to recognize that interference exists in the used frequency band, without measurement in recognition of an unused wireless channel on another communication. Therefore, a waste of operation in which the detecting device 102 measures the use-state of a wireless channel that is known to be in communication is prevented from being performed. In the case where a required communication band width is registered in the database portion 1038, when interference of a part of the band is measured, it is possible to know that the whole communication band width is used. Therefore, the use-state of a wireless channel can be easily detected. When the QoS information is registered in the database, a wireless channel which is similar in term of the frequency, time, space, and diffusion code in communication that requires a high QoS, and in which interference at a certain degree is produced is not determined as an unused wireless channel, and by contrast also a wireless channel which is similar in term of the frequency, time, space, and diffusion code in communication that is not problematic at a low QoS, and in which interference at a certain degree is produced can be determined as an unused wireless channel.

Furthermore, information such as a result of detection of the wireless-channel use-state, and notification of a wireless channel to be used in communication may be notified by using a fixed notification wireless channel dedicated to the present cognitive radio system, or a notified wireless channel may be designated by using a fixed control wireless channel dedicated to the present cognitive radio system. Alternatively, notification may be performed through a wire. In the case where a wireless terminal device in charging is used also as a wireless-channel use-state detecting device, for example, it is not necessary to care about the power consumption, and hence a method may be employed in which a wireless-channel use-state is frequently measured, and the use-state is notified through PLC (Power Line Communication), a wired LAN, or the like.

In this way, by using interference information detected by the detecting device 102, a wireless terminal device can perform wireless communication by using an unused wireless channel, and also in consideration of a wireless-channel use-state which cannot be detected by the detecting device 102, from the database relating to wireless. Therefore, interference with the existing radio system can be suppressed, and an unused wireless channel can be effectively used. Since a communication wireless channel is selected in the internal DB 103, the throughput of the transmitter/receiver of the terminal can be reduced.

In the embodiment described above, the channel use-state detecting device 102 is shown as an independent device. Alternatively, the device may be included in the same device as the internal DB 103, or included in the wireless terminal device 105. Similarly, also the internal DB 103 is shown as an independent device. Alternatively, the device may be included in at least one of the wireless terminal devices 105, 106.

(Modification of FIG. 5)

A modification of the embodiment will be described. FIG. 6 is a sequence diagram showing an example in which the internal DB 103 checks the positions of the terminals 105, 106, thereafter calculates the reliability of measured channel use-state information, and an unused channel is recognized by using information of a channel use-state in which the reliability is high as a result of calculation. For example, the reliability is calculated by the unused-channel recognizing portion 1034 of FIG. 3. In FIG. 6, components identical with those of FIG. 5 are denoted by the same reference numerals.

The internal DB 103 checks the positions of the terminals 105, 106, and thereafter calculates the reliability of measured channel use-state information (step S600). Hereinafter, a calculation example of the reliability of channel use-state information will be described.

First, the channel use-state detecting device m existing at a position $L_m$ measures a reception power $P_{m,f,t,c}$ at a time $\tau_m$ with respect to the frequency band f, the time slot t, and the diffusion code c. When the measurement is ended, the device notifies the DB of a result of the measurement. The DB 103 gathers information from an m number of channel use-state detecting devices under control, and stores the information. In the case where determination whether information is reliable or not is performed in the transmitting/receiving terminal n, the reliability of the channel use-state information is used. The information reliability $R_n$ in the transmitting/receiving terminal n can be obtained by using following Expression (3):

$$R_n = \sum_{m=0}^{M} \left[ G(L_n - L_m) \times \left( \frac{1}{\tau_{now} - \tau_m} \right) \times L_p(|L_n - L_m|) \right]$$

where $G_n$ ($L_n-L_m$) is the antenna gain with respect to the direction ($L_n-L_m$). In case of an omni-antenna, the gain is 1 irrespective of the direction. Furthermore, $L_p(|L_n-L_m|)$ is the propagation loss with respect to the distance $|L_n-L_m|$.

The propagation loss is a function of an inverse relational relationship in which, as given by the Okumura curve, Hata formula, or the like, the value is larger as the distance is shorter, and the value is smaller as the distance is longer. Here, in order to obtain reliability information, calculation is performed by using the position, the antenna gain, and the time. Alternatively, the reliability may be calculated by using only one of the items. Following Expression (4) shows an example in which the reliability is calculated by using only the term of the time.

$$R_n = \sum_{m=0}^{M} \left( \frac{1}{\tau_{now} - \tau_m} \right) \quad \text{Expression (4)}$$

Following Expression (5) shows a calculation in the reliability is calculated by using only the term of the position.

$$R_n = \sum_{m=0}^{M} \left( \frac{1}{L_p(|L_n - L_m|)} \right) \quad \text{Expression (5)}$$

When calculation is performed by using the expression, the reliability is calculated in accordance with the position of the channel use-state detecting device.

FIGS. 7 and 8 show examples of the relationships between the positions of terminals and the reliability. In the examples, it is assumed that both the channel use-state detecting device and the transmitting/receiving function are mounted on the terminals.

Even when the same channel use-state is registered in DBs of terminals A and B, for example, reliance is placed on information of a positionally close terminal, and hence high-reliability information for the terminal A is different from that for the terminal B. In the case where the transmitter/receiver itself can measure the channel use-state, a result which is measured by itself is most reliable information.

In the case where the channel use-state detecting device has a configuration in which the interference signal can be accurately measured by using a high-performance device such as a high-resolution A/D converter, it is contemplated that a correction term is added as following Expression (6):

$$R_n = \sum_{m=0}^{M} \left[ s_m \times \left( \frac{1}{\tau_{now} - \tau_m} \right) \right]$$

In the above expression, $S_m$ is the interference measurement accuracy of the channel use-state detecting device, and proportional to a value such as the number of bits of the A/D converter. If the reliability is sufficiently high, it is determined that the currently existing channel use-state information is reliable.

In the case where the reliability is low and it is determined that the channel use-state information is not reliable, a channel measurement request is issued to the detecting device 102 so as to perform a change of the antenna gain, or the like, and again the measurement (step S601). The detecting device 102 measures the channel use-state (step S602), and transmits a result of the measurement to the DB 103 (step S603).

In the case where, even when the measurement is performed, reliable information is not obtained, it is determined that the channel use-state detecting device does not exist in the vicinity of the transmitting/receiving terminal n, and transmission of the transmitting/receiving terminal n is postponed because the channel use-state cannot be detected. The determination whether the reliability is high or not may be performed by a method in which the determination is performed based on a threshold. It is preferable that the threshold is determined by systems which share the channel. In the case where cognitive wireless communication is to be performed by using a channel of a wireless apparatus which has a low resistance against interference, such as radio astronomy, the threshold is set to high. By setting the threshold in this way, in the case where cognitive wireless communication is to be performed by using a channel of a wireless apparatus which has a low resistance against interference, communication is allowed to be performed only when the channel use-state measurement information is highly reliable, whereby the influence exerted on the existing communication can be suppressed to the minimum level. In the case where cognitive wireless communication is to be performed by using a channel of a wireless apparatus which has a certain level of resistance against interference, such as digital wireless communication like a wireless LAN, the threshold is set to low. By setting the threshold in this way, in the case where cognitive wireless communication is to be performed by using a channel of a wireless apparatus which has a certain level of resistance against interference, communication is allowed to be performed even when the channel use-state measurement information is not highly reliable, whereby the frequency use efficiency can be improved.

In the case where it is determined that information has high reliability and determination whether the channel is an unused channel or not based on information currently existing in the DB is reliable, it is determined whether the channel which has been measured in the detecting device 102 is an unused channel in the internal DB 103 or not. In this way, an unused channel is recognized while discriminating channel use-state information which has been measured by using the reliability.

Therefore, an unused channel can be accurately recognized.

Second Embodiment

Next, a second-embodiment of the invention will be described. In the first embodiment described above, recognition of an unused channel is performed by the internal DB 103. In the second embodiment, from channel use-state information supplied from the internal DB 103, the terminals 105, 106 recognize an unused channel, and set a communication channel.

FIG. 9 is a diagram schematically showing the configurations of the terminals 105, 106 in the second embodiment. The terminals 105, 106 have the same configuration, and therefore description of the terminal 106 is omitted. In FIG. 9, components identical with those of FIG. 2 are denoted by the same reference numerals, and their detailed description is omitted. The figure is different from FIG. 2 in that an unused-channel recognizing portion 1056 is disposed.

FIG. 10 is a sequence diagram showing an example of the process and message exchange in the second embodiment. First, the wireless-channel use-state detecting device 102 (hereinafter, referred to as "detecting device 102") receives a request of the internal DB 103 (step S701), and detects the use-state of a wireless channel (step S702). The detecting device 102 notifies the internal DB 103 of information relating to a measurement result of the detected wireless-channel use-state information (step S703). The internal DB 103 registers the notified measurement result (step S704). On the other hand, the internal DB 103 receives information relating to the wireless-channel use-state, also from the external DB 104 (step S705). The internal DB 103 organizes information received from the detecting device 102 and the external DB 104, and registers the information (step S706). The processes so far performed correspond to the session (session 1) to the time when the detection result of the detecting device 102 indicating a use-state of a wireless channel is registered in the internal DB 103.

Next, when a request for communicating by wireless with the terminal 106 is generated in the terminal 105, the terminal 105 notifies the internal DB 103 of its own position information and identification information of the communication partner (step S707). The internal DB 103 identifies the terminal 106 which is the communication partner, on the basis of the identification information notified from the terminal 105, and requests the terminal 106 to send position information (step S708) The terminal 106 which receives the request notifies the position information to the internal DB 103 (step S709).

Thereafter, the internal DB 103 notifies the terminal 105 of information relating to the wireless-channel use-state (step S710). At this time, in accordance with the position of the terminal, it may be contemplated that, as the information relating to the wireless-channel use-state, a wireless-channel use-state which is measured in the vicinity, and a state of a signal which is transmitted in the vicinity are selected and notified. If the transmission system registers a communication schedule in the database, or if the system of the measured interference can be deduced, the distance by which the transmission signal reaches at a power more than noise to provide interference is calculated from the transmission power and carrier frequency of the system. When the distance is shorter than the calculated distance, the distance is set as the vicinity. In the terminal 105, using the information, an unused-channel recognizing portion 1057 (see FIG. 9) of the terminal 105 recognizes an unused channel (step S711). Thereafter, the communication channel setting portion 1052 (see FIG. 9) of the terminal 105 selects a wireless channel through which communication is to be performed (step S712). The selected wireless channel is sent from the communication channel setting portion 1052 to the wireless communication transmitting/receiving portion 1053, and notified to the terminal 106 (step S713). After a reply (ACK) is returned from the terminal 106 (step S714), communication is started by using the selected wireless channel (step S715). The processes so far is the session (session 2) to the time when the terminal 105 obtains information relating to the use-state of the wireless channel from the internal DB 103 to recognize an unused channel, and starts communication with the terminal 106.

In the embodiment, the terminal itself recognizes an unused channel, and independently selects a communication wireless channel. Therefore, the process in the internal DB can be reduced.

Third Embodiment

Next, a third embodiment of the invention will be described.

Figure 11:
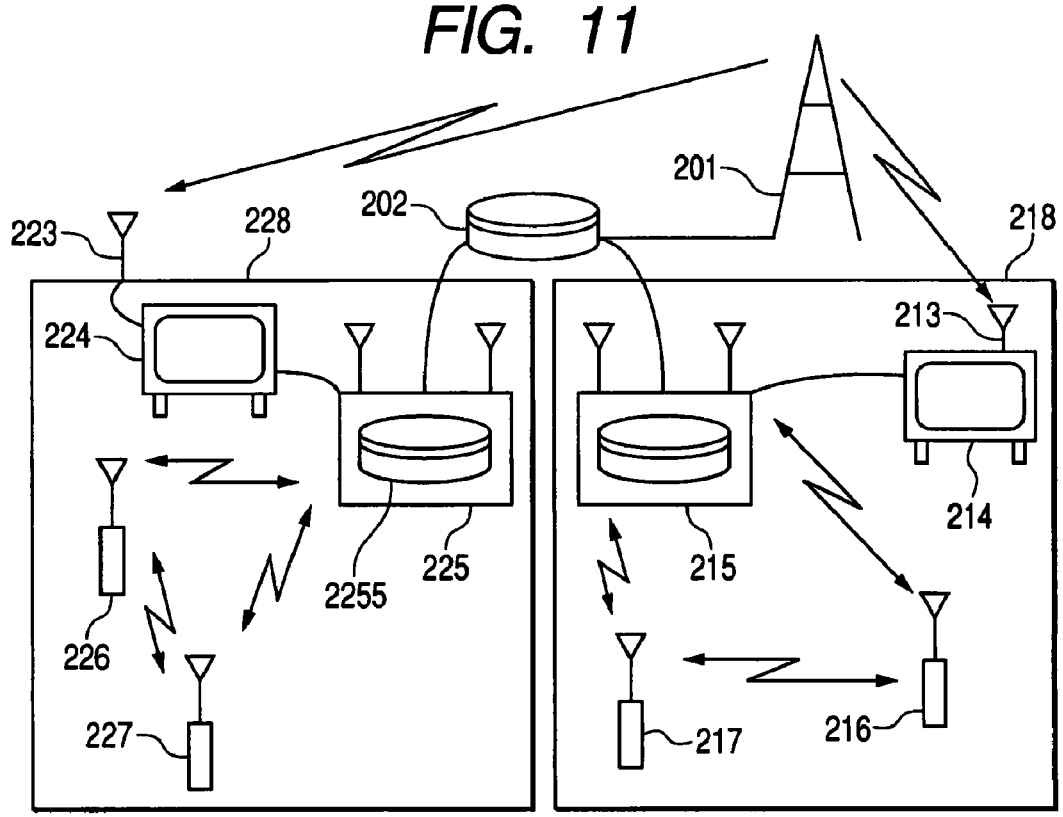
FIG. 11 is a diagram schematically showing the configuration of a system in a third embodiment of the invention.

FIG. 11 is a diagram schematically showing the configuration of a system in the third embodiment. In the embodiment, a television broadcast (TV broadcast), and a local area network (W-LAN) using a radio system share a frequency band for the TV broadcast. A TV broadcast antenna 201 transmits a broadcast signal to a certain area by using several frequency bands. At this time, a wireless information DB 202 in a broadcast area stores information such as the frequency band of the current broadcast, the position of a broadcast station, and the radio-wave arrival range.

In private houses 218, 228, a signal transmitted from the TV broadcast antenna 201 is received by TV receiving antennas 213, 223. The TV receiving antenna 223 is disposed outdoors. It is assumed that TVs 214, 224 can share information by wire or wireless through W-LAN access points (APs) 215, 225 in the private houses 218, 228. Therefore, the TVs 214, 224 are wireless devices having a television receiving function which can communicate with the wireless LAN access points, and which have a function of receiving a television broadcast. The TVs 214, 224 and the APs 215, 225 can share information of frequency bands which are currently received by the TVs 214, 224. The APs 215, 225 and the wireless information DB 202 can share information by wire or wireless. The APs 215, 225 comprise a wireless-channel use-state detecting device, so that the access points themselves can detect the use-state of a wireless channel. The access points function also as a home server which obtains the reception status of each TV and the status of indoor communication.

Wireless transmitter/receivers 216, 217, 226, 227 (hereinafter, referred to as STs 216, 217, 226, 227) function as a station (ST) of the W-LAN, the STs 216, 217 communicate with the AP 215, and the STs 226, 227 communicate with the AP 225. The STs can communicate also with themselves. The TV 214, 224 know the positions of the antennas 213, 223, respectively, and can notify the APs 215, 225 of the position information, respectively. As a method of knowing the positions of the antennas 213, 223, a method may be employed in which, since a TV antenna is usually fixed, the position information is registered in a TV in the initial disposition of an antenna. The STs 216, 217, 226, 227 have a function of knowing the own position, and can notify the APs 215, 225 of the position information. Similarly, the APs 215, 225 have a function of knowing the own position. As the function of knowing position information, for example, a position information obtaining function using a GPS may be used.

Figure 12:
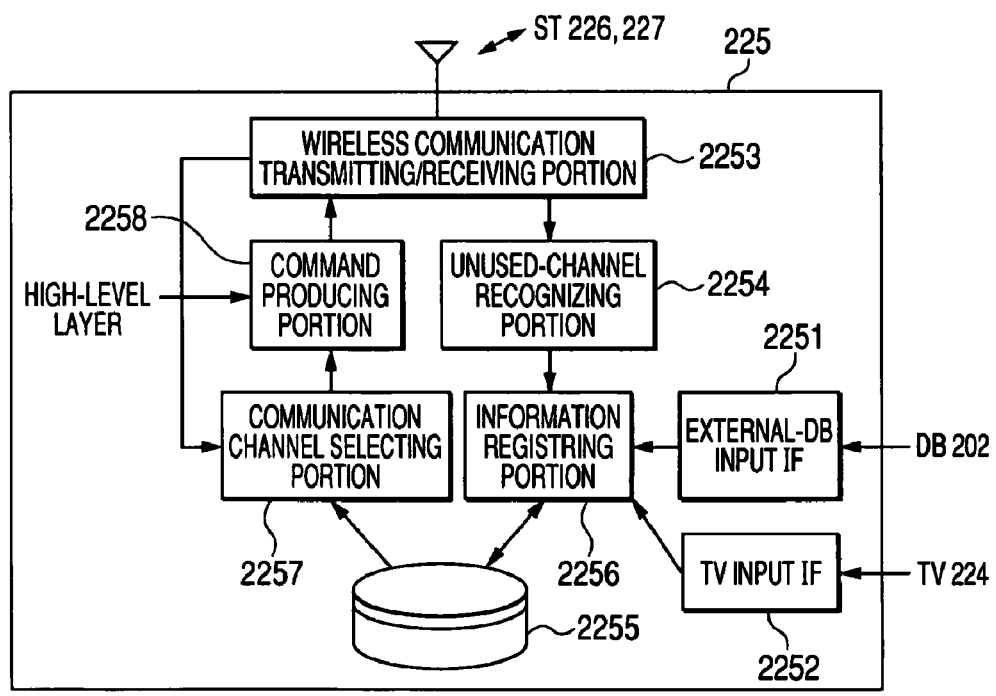
FIG. 12 is a diagram schematically showing the configuration of an access point.

FIG. 12 is a diagram schematically showing the configuration of the access point 225. The AP 215 is configured in the same manner as the AP 225, and therefore its description is omitted. The AP 225 can communicate with the STs 226, 227, the wireless information DB 202, and the TV 224. Interfaces 2251, 2252 receive signals from the wireless information DB 202 and the TV 224, respectively. A wireless communication transmitting/receiving portion 2253 modulates a signal to be transmitted through the set communication channel, and demodulates a received signal. The AP 225 further comprises: an unused-channel recognizing portion 2254 which recognizes a wireless channel in an unused state on the basis of the wireless-channel use-state information that is supplied from the STs 226, 227; an information registering portion 2256 which organizes information received from the wireless information DB 202, and which registers the organized information into a database portion 2255; a communication channel selecting portion 2257; and a command producing portion 2258 which produces various commands on the basis of instructions from the high-level layer.

Figure 13:
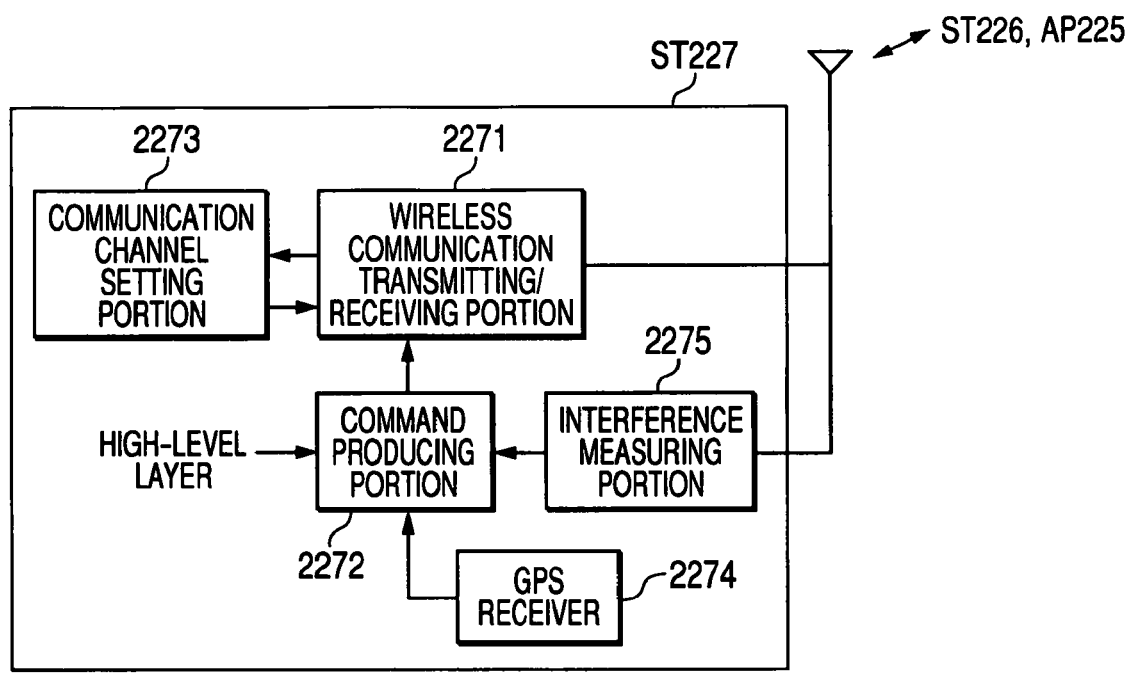
FIG. 13 is a diagram schematically showing the configuration of a wireless terminal.

FIG. 13 is a diagram showing the configuration of the ST 227. The STs 216, 217, 226 are configured in the same manner as the ST 227, and therefore their description is omitted. The ST 227 further comprises: a wireless communication transmitting/receiving portion 2271 which modulates a signal to be transmitted through the set communication channel, and which demodulates a received signal; and a command producing portion 2272 which produces various commands on the basis of instructions from the high-level layer. The ST further comprises; a communication channel setting portion which sets a communication channel on the basis of the information that is received from the AP 225; and a GPS receiver 2274 which measures its own position, and notifies it to the AP 225. The ST further comprises an interference measuring portion 2275 which, based on a request from the AP 225, receives a signal of a designated wireless channel, calculates the reception power, and measures the noise level.

Figure 14:
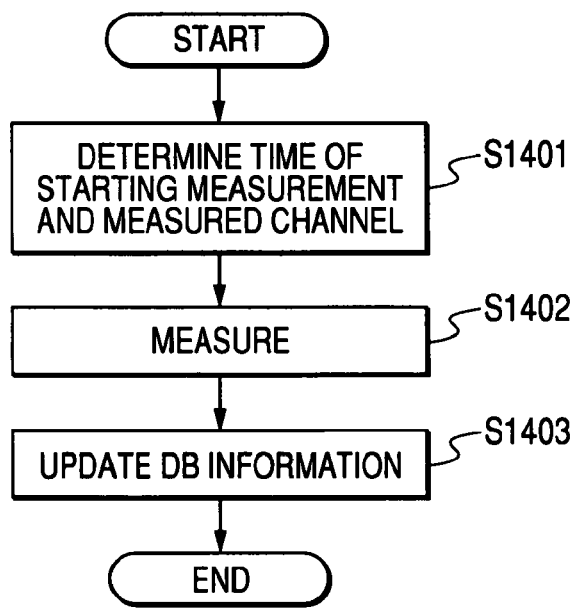
FIG. 14 is a flowchart of a process of updating database information in an access point.

FIG. 14 shows a process flow of the whole system for updating DB information in the APs 215, 225 and information of the DB 202. First, the APs 215, 225 determine the time of starting the wireless-channel use-state detection, and a wireless channel to be measured (step S1401). For example, the APs 215, 225 determine that a terminal under control (e.g., the ST 217) is caused to detect the wireless-channel use-state of a certain frequency band at a frequency of once per millisecond. Furthermore, the APs 215, 225 determine that the ST 216 is caused to detect the wireless-channel use-state of another frequency band, and determine that the APs themselves to detect the wireless-channel use-states of the other frequency bands. In the embodiment, all object frequency regions are sequentially subjected to detection. Alternatively, all object frequency regions may be subjected to detection at one time.

After the time of starting the wireless-channel use-state detection and a wireless channel to be measured are determined, the wireless-channel use-state is actually measured (step S1402). In the embodiment, the APs 215, 225 request the terminals STs under control to measure the frequency status. The STs which are requested to perform the measurement measure the wireless-channel use-state in a designated frequency region. In the measurement of the wireless-channel use-state, a signal of a designated wireless channel is received, and the reception power of the signal is calculated. If the reception power is in the noise level, it is determined that no interference exists, and, if the reception power is higher than the noise level, it is determined that interference exists, or the radio wave is used by another terminal and the TV broadcast. For example, although a reception power exists, a power that is lower than a level at which the reception power can be demodulated and decoded as a signal is defined as the noise level. When the power is lower than the noise level, it is determined that a radio wave is not used. An ST in which existence of interference has been measured notifies an AP which controls the ST, of the position information and a measurement result. Since the APs 215, 225 have a wireless receiving function, the APs themselves can detect the wireless-channel use-state.

When the wireless-channel use-state measurement is ended and the result is notified to the APs, each of the APs updates the DB information by using information relating to the wireless-channel use-state which has been measured by itself, information notified from the STs, and information from the DB 202 (step S1403).

FIG. 15 shows information of use-states of frequency bands at certain positions, and information sources from which the information is obtained, in information stored in the DB 2255 of the AP 225.

When the ST 227 existing at position Nx03, Ey03 notifies the AP 225 of information relating to the wireless-channel use-state of f07 MHz band, the AP 225 searches the current DB information. If information of the same position and the same frequency band exists, the old information is deleted, and the new information is added. In the case where the AP 225 obtains from the DB 202 information relating to the broadcast, the AP obtains information indicating the wireless channel in which a TV broadcast is performed. In the example of FIG. 15, it is shown that a TV broadcast is performed in wireless channels of frequency bands of f01 MHz, f03 MHz, f04 MHz, and f06 MHz. Also when information of a wireless channel which is currently received is obtained from the TV 224, similarly, information is obtained, thereafter the old information is deleted, and the new information is added. In the example of FIG. 15, it is shown that, in a wireless channel of the frequency band of f01 MHz, reception is performed at position Nx01, Ey01 where the TV antenna 223 exists.

A term of validity may be disposed in information of a wireless channel use-state. In this case, when a respective term of validity expires, corresponding information is deleted from the DB, and required information is obtained from the DB 202 and the TV 224 as necessary, or the STs 226, 227 are caused to measure a wireless-channel use-state and notify it. (Modification of FIG. 15)

FIG. 16 shows a modification of the information table shown in FIG. 15. As shown in FIG. 16, when information is received, also the time of updating information may be simultaneously recorded. Raw data of an interference power may be recorded as they are in the use-state column of each frequency band. For example, it is indicated that, at position Nx02, Ey02, the ST 226 receives a wireless channel of f07 MHz at −61 dBm, and the information is written into the database of the AP 225 at 12:21:48.20 to perform updation. Furthermore, it is indicated that, at position Nx03, Ey03, the ST 227 receives a wireless channel of f07 MHz at −68 dBm, and the information is written into the database of the AP 225 at 12:21:49.20 to perform updation.

FIG. 17 is a sequence diagram showing an example of message exchanges which are conducted by the DBs for gathering wireless-channel use-state information. The database (DB 2255) in the AP 225 causes the STs 226, 227 and TV 224 which can exchange information with the AP by wire or wireless, to notify a wireless-channel use-state. In FIG. 17, the TV 224 is requested so that information of a received wireless channel is notified from the AP 225 to the TV 224, at an interval of several to several tens of seconds. Similarly, it is requested so that information is notified from the AP 215 to the TV 214 (step S1201).

Upon receiving the request, the TV 224 returns information of a wireless channel which is currently received, and position information of the receiving antenna 223. Similarly, upon receiving the request, the TV 214 returns information of a wireless channel which is currently received, and position information of the receiving antenna 213 (step S1202). Only when, without a request from the AP 225 (AP 215), the power is turned ON/OFF or a receiving wireless channel is changed, the TV 224 (TV 214) may notify the information to the AP 225 (AP 215).

Next, the AP 225 issues to the ST 226 and the ST 227 a request for notifying interference power information. Similarly, the AP 215 issues to the ST 216 and the ST 217 a request for notifying interference power information (step S1203). This request includes information of a wireless channel to be measured. The ST 226 (ST 216) and ST 227 (ST 217) which receive the request check the presence or absence of an interference power in a wireless channel designated by the AP 225 (AP 215), and notify the AP 225 (AP 215) of a combination of a result of the check and information of the position where the ST currently exists (step S1204). When such information is gathered and a process of FIG. 21 described below is performed, the database in the AP 225 (AP 215) can know the use-states of the frequencies (wireless channels) at the positions shown in FIG. 15.

Returning to FIG. 17, the DB 202 relating to the TV broadcast handles reception information of a TV in the area and interference information, in addition to transmission information of the TV broadcast. For example, the DB 202 requests the TV broadcast station (antenna) 201 to send information of the wireless-channel use-state of current transmission (step S1205). Upon request, the TV broadcast station 201 notifies the DB 202 of information of the wireless-channel use-state (step S1206).

Furthermore, the DB 202 periodically issues a request for notifying information, to databases in APs in the area (steps S1207, S1209), and receives information from the databases (steps S1208, S1210). In this example, information in which position information is added to information during TV reception in each AP and information relating to detected interference is notified to the DB 202. In place of the method in which the local DB 202 issues an information request and an AP that receives the request notifies information, another method may be employed in which information is notified to the local DB 202 while using updation of the contents of the DB 202 in the AP as a trigger.

FIG. 18 shows information of use-states of frequency bands at a certain position among information held by the DB 202, and information sources from which the information is obtained. When information is gathered as described above, the DB 202 can know the use-states of the frequencies (wireless channels) at the positions as shown in FIG. 18.
(Modification of FIG. 18)

FIG. 19 shows a modification of the information table shown in FIG. 18. As shown in FIG. 19, when information is received, also the time of updating information may be simultaneously recorded. Raw data of an interference power may be recorded as they are in the use-state column of each frequency band. This is identical with the table shown in FIG. 16.

Figure 20:
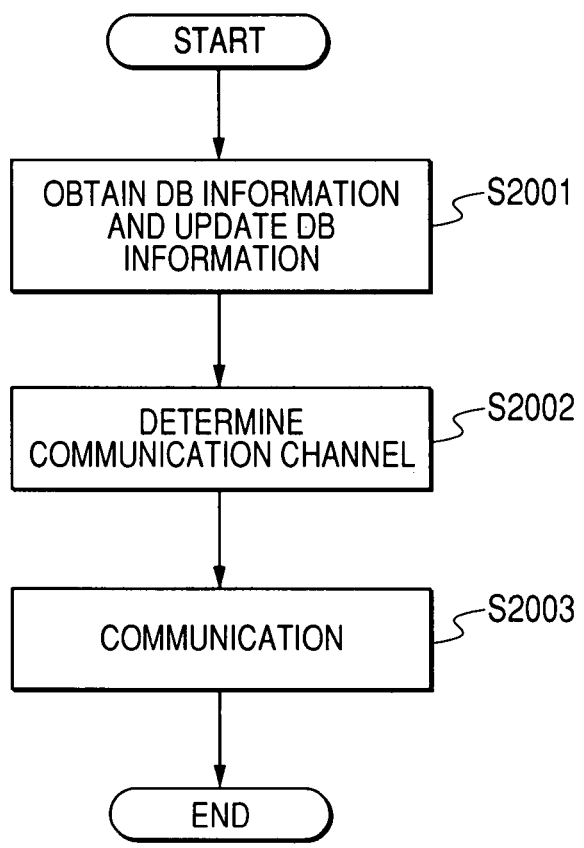
FIG. 20 is a flow chart of a process for starting communication by using information stored in the database.

FIG. 20 is a process flow chart of the whole system of the embodiment for starting communication by using information stored in the DB 202. Hereinafter, the process flow will be described with reference to FIG. 20.

An AP (for example, the AP 225) which receives a communication start request from an ST (for example, the ST 227) first obtains information from the DB 202 in order to obtain the latest wireless-channel use-state, and, based on the information, updates the DB information (for example, the DB2255 in the AP225) (step S2001). At this time, when a method in which the DB information of the AP 225 is updated each time when the state of the DB 202 connected to the AP 225 or the TV is changed is employed, the work of step S2001 is not required. Then, the AP 225 determines a wireless channel through which the ST 227 is to perform communication (step S2002). The determined wireless channel is notified to the ST 227, and the ST 227 which receives the notification starts communication by using the designated wireless channel (step S2003).

Figure 21:
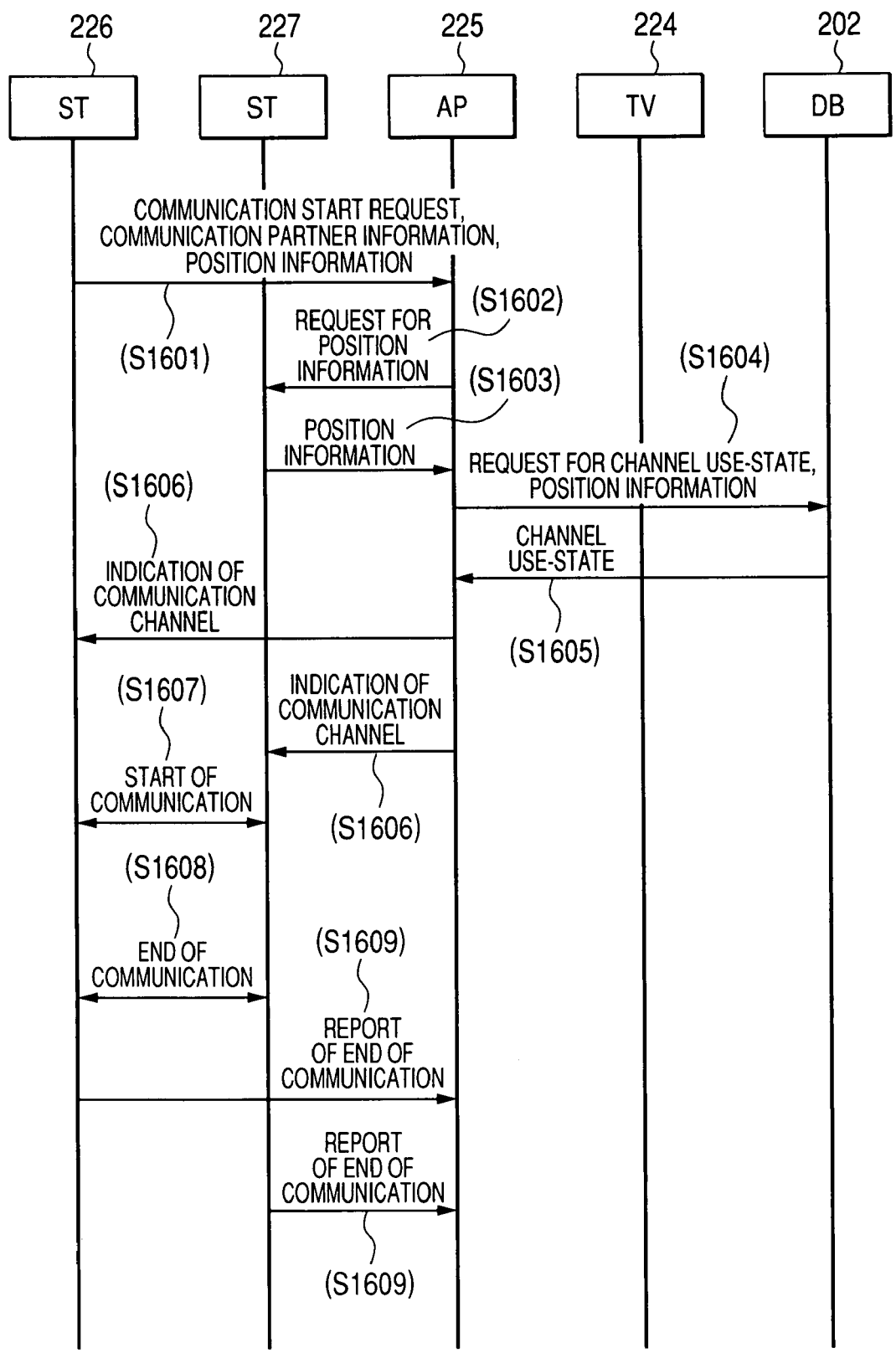
FIG. 21 is a sequence diagram showing message exchanges occurring in communication using database information.

FIG. 21 is a sequence diagram showing an example relating to message exchanges occurring in communication using DB information. The figure shows the case where the STs 226, 227 communicate with each other in the ad-hoc mode.

First, in the case where a request for starting communication is generated in the ST 226, the ST 226 transmits a communication start request message to the AP 225 (step S1601). At this time, in the case where the ST wishes to communicate with another ST in the ad-hoc mode, the message includes information such as the identification number of the communication partner. In the case of FIG. 21, there is a request for communicating with the ST 227, and hence the identification number of the ST 227 is notified to the AP 225. It is assumed that identification information such as the identification number of STs which are under control of the AP 225 is previously known at the establishment of the network (at power ON or the like) or through periodical update. At the same time, also position information of the ST 226 is notified to the AP 225. When these sets of information are to be notified to the AP 225, communication may be performed by using a predetermined wireless channel dedicated to notification, or a wireless channel for notifying the information may be previously transmitted to the AP 225 by using a predetermined wireless channel dedicated to control. Alternatively, interference may be previously measured, and then the information may be notified by using an arbitrary wireless channel in which interference does not exist.

The AP 225 which receives the request of the ST 226 for communicating with the ST 227 first issues a position information request in order to check the position of the ST 227, to the ST 227 (step S1602). The ST 227 notifies the AP 225 of information of the position where the ST 227 currently exists (step S1603). Thereafter, the AP 225 requests the DB 202 having interference information of the area to send a wireless-channel use-state (step S1604). In response to the request, the DB 202 provides latest information (step S1605). At this time, the AP 225 notifies the DB 202 of position information of the ST 226, and position information with reference to information of the ST 227. In the DB 202, the amount of information to be subjected to communication can be reduced by providing the wireless-channel use-state relating to the periphery of the STs 226, 227. Here, the periphery indicates a range where existing communication is affected by transmitting a signal from the STs 226, 227, with reference to position information and in consideration of the transmission powers and antenna directionalities of the STs 226, 227.

As a result of the above process, a DB 225A in the AP 225 obtains information such as shown in FIG. 15. These sets of information are classified into several attributes. For example, information can be divided and organized into attributes such as a wireless channel which is received by the TV 224, that which is transmitted by the TV broadcast station 201, that which is used in communication by another terminal, that which is used by an unknown system, and in which interference exists, and that in which interference does not exist.

Returning to FIG. 21, the AP 225 determines the communication band by a method shown in FIG. 22 described below, by using the position information of the ST 226, the position information of the ST 227, and the channel use-state obtained from the DB 202, and notifies the STs 226, 227 of the communication channel (step S1606). The STs 226, 227 perform a desired communication by using the notified communication band (wireless channel) (step S1607). For example, the ST 226 transmits a preamble by using the notified wireless channel, and the ST 227 receives the preamble transmitted by the ST 226 and returns an ACK. Upon receiving the ACK, the ST 226 starts transmittance of data to be transmitted. In the AP 225, at this time, the phenomenon that the STs 226, 227 are communicating with each other is registered in the DB. The AP 225 knows the wireless channel which is being used in communication. When a request for performing communication is newly generated, therefore, it is possible to prevent the communication between the STs 226, 227 from being disturbed.

When the communication is ended (step S1608), the STs 226, 227 notify the AP 225 of the end of communication (step S1609). In the AP 225, the information indication that the STs 226, 227 are communicating with each other is deleted from the DB, and the wireless channel is opened to other communication.

Figure 22:
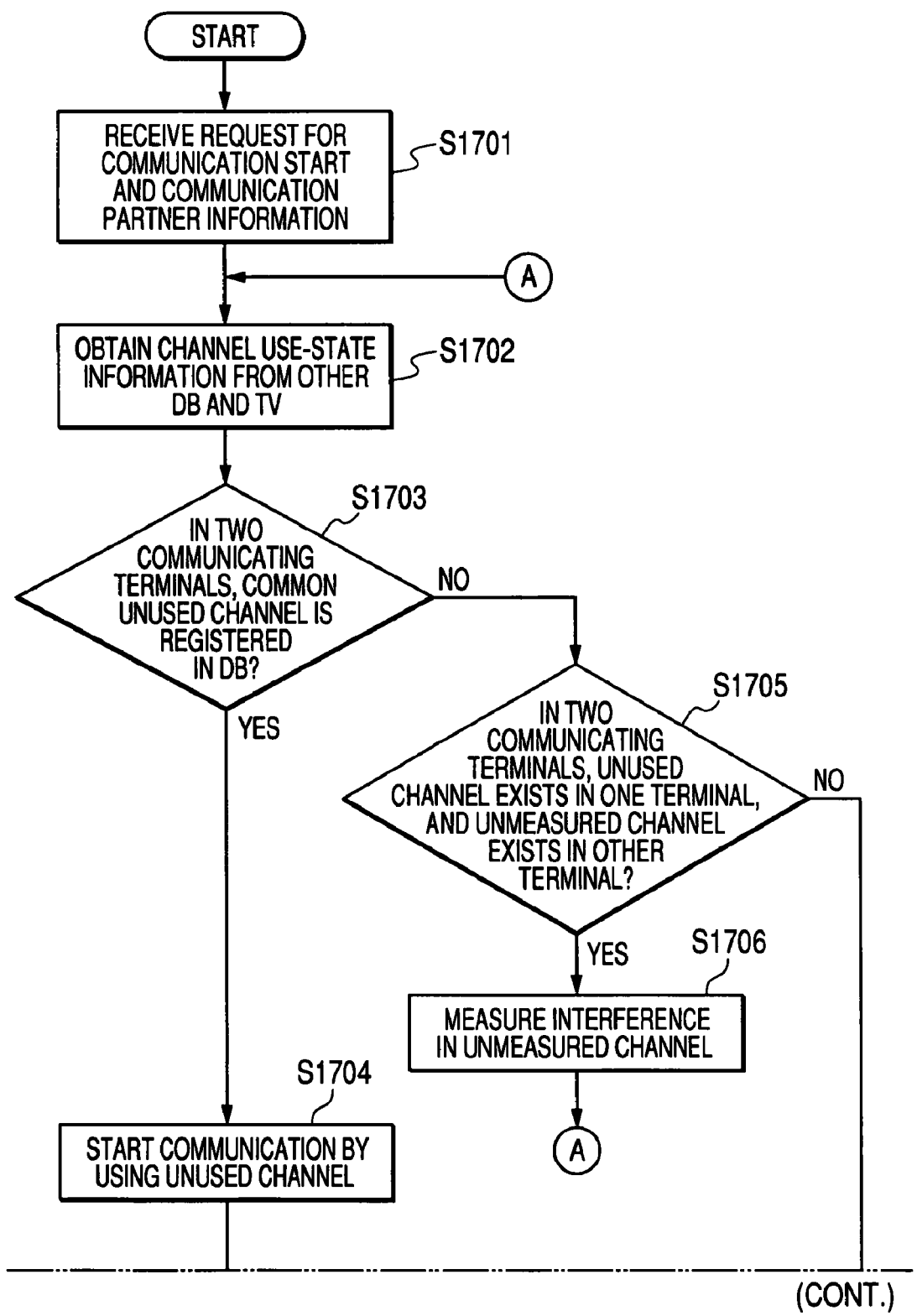
FIG. 22 is a flowchart showing a communication band determination algorithm.

FIG. 22 is a flowchart showing an example of a communication band determination algorithm. First, the AP 225 obtains a communication start request of the ST 226, information of the communication partner, and position information of the ST 226 (step S1701). Next, the ST 227 is requested to send position information of the ST 227, and notify it to the AP 225. Furthermore, information relating to the wireless-channel use-state is obtained from the DB 202 and the TV 224 (step S1702). At this time, information relating to the wireless-channel use-state is periodically received from the STs 226, 227. Therefore, it is assumed that, as the example shown in FIG. 15, the AP 225 already knows the wireless-channel use-states of the STs 226, 227.

Next, the AP 225 checks and determines whether an unused wireless channel exists at the positions of the ST 226 issuing the communication request, and the ST 227 which is the communication partner or not (step S1703). The criterion by which it is determined whether an unused wireless channel exists or not is as follows. The determination is conducted depending on whether, when the wireless-channel use-state is to be detected, a power which is higher than a threshold is measured at the position and in the wireless channel or not. If a common unused wireless channel exists (the result of the determination in step S1703 is Yes), the AP 225 determines that the unused wireless channel is a wireless channel to be used in communication in the STs 226, 227, and notifies the determination to the STs 226, 227, thereby causing the STs 226, 227 to start communication (step S1704). In case of the DB information such as the example shown in FIG. 15, a common unused wireless channel does not exist in the STs 226, 227, and hence the determination in step S1703 is No.

If a common unused wireless channel does not exist in STs to perform communication (the determination in step S1703 is No), the AP 225 checks whether an unused wireless channel exists in one of the STs and a wireless channel that has not been measured exists in the other ST or not (step S1705). In the example shown in FIG. 15, f02 MHz is an unused wireless channel for the ST 226, and an unmeasured wireless channel for the ST 227. Similarly, f07 MHz is an unused wireless channel for the ST 227, and an unmeasured wireless channel for the ST 226. If such a wireless channel exists (the result of the determination in step S1705 is Yes), an interference measurement is performed on the unmeasured ST (step S1706). In the example of FIG. 15, namely, a request for measuring the wireless channel of f07 MHz is issued to the ST 226, and the wireless-channel use-state DB is updated by using a result of the measurement. Similarly, a request for measuring the wireless channel of f02 MHz is issued to the ST 227, and the wireless-channel use-state DB is updated by using a result of the measurement. After, information of the wireless-channel use-state DB is updated, the process is restarted from the obtaining of position information in the ST 227 (step S1701).

If the result of the determination in step S1705 is No, it is checked whether an unmeasured wireless channel exists in both the STs 226, 227 or not (S1707). If the result of the determination in step S1707 is Yes, the measurement request is issued (step S1708).

If a common unused wireless channel does not exist in the STs 226, 227 and also an unmeasured wireless channel does not exist (the result of the determination in step S1707 is No), it is determined whether an apparatus using a wireless channel which is not an unused wireless channel exists in the periphery of apparatuses performing communication (the STs 226, 227) or not (step S1709). In an example in which it is determined whether the position where another apparatus exists is in "periphery" or not, the determination is conducted depending on whether, when a transmission signal is transmitted, the reception performance of an apparatus which performs communication and broadcast reception through the same wireless channel is affected in consideration of the transmission powers and antenna directionalities or not. For example, the case where the ST 226 having an omnidirectional antenna performs transmission at a frequency band of f01 MHz by using a certain transmission power will be considered. The distance between the TV 224 and ST 226 which are receiving in a wireless channel of f01 MHz is calculated, and the propagation loss of a signal transmitted from the ST 226 is calculated. If the distance is a distance at which a signal power higher than the reception tolerance of the TV 224 is expected to reach the TV 224, it is determined that the TV 224 is in the periphery of the ST 227. Similarly, determination whether, with respect to communication performed at position Nx04, Ey04 and in the frequency band of f05 MHz, the position where the communication is performed in the periphery of the STs 226, 227 or not is conducted in the following manner. The propagation distance in which the transmission powers and antenna directionalities of the STs 226, 227 are considered is calculated. From the distances between the STs 226, 227 and the position Nx04, Ey04, a signal power which reaches the position Nx04, Ey04 is calculated. Then, the reception tolerance of the communication is compared with the calculated signal power which reaches the position Nx04, Ey04. If the reception tolerance of the communication is larger, it is determined that the position is not in the periphery, and, if the reaching signal power is larger, it is determined that the position is in the periphery. In the case where determination whether an apparatus is in the periphery or not is conducted by using such a criterion, transmission powers, antenna directionalities, reception tolerances and the like of communication system apparatuses which can be set to be under control must be previously registered in the AP 225.

If it is determined in step S1709 that an apparatus using the wireless channel does not exist in the periphery (the result of the determination is Yes), the wireless-channel use-state is measured in the place by way of precaution in the STs 226, 227 (step S1710). This is performed because, even in the case where an apparatus using the wireless channel does not exist in the periphery, when an apparatus which is not in the periphery has a large transmission power, the power causes interference to disable communication. In the example of FIG. 15, also in the case where it is determined that communication performed at position Nx04, Ey04 and in the frequency band of f05 MHz is not in the periphery, a measurement is performed in the frequency band of f05 MHz, and, if a signal power higher than the reception tolerance is measured in the STs 226, 227 (the result of the determination in step S1711 is No), it is determined that the wireless channel is not an unused wireless channel. If it is determined in step S1709 or S1711 that an unused wireless channel does not exist, it is determined that wireless channels are busy and communication is disabled, and, after a predetermined time period elapses (step S1712), position information of a communication terminal is again obtained (step S1701). If it is determined in step S1711 that the wireless channel is an unused wireless channel (the result of the determination in step S1711 is Yes), it is determined that an apparatus using the wireless channel does not exist in the periphery, and instructions for performing communication by using the wireless channel are issued to the STs 226, 227. As a result, the STs 226, 227 start communication (step S1713).

As described above, in the system, an ST of a wireless LAN is caused to detect a wireless-channel use-state, reception information of a TV and information in a local server are obtained, and an AP designates a wireless channel used for an ST, whereby communications between ST-AP and ST-ST are enabled by using a time zone in which a TV broadcast is not performed, a frequency band and place in which a peripheral TV does not perform reception, and a frequency band and place in which other STs do not perform reception. Therefore, the frequency use efficiency is remarkably improved as compared with a method in which a frequency is allocated to each system.

Modification of the Third Embodiment

Hereinafter, a modification of the third embodiment will be described.

Figure 23:
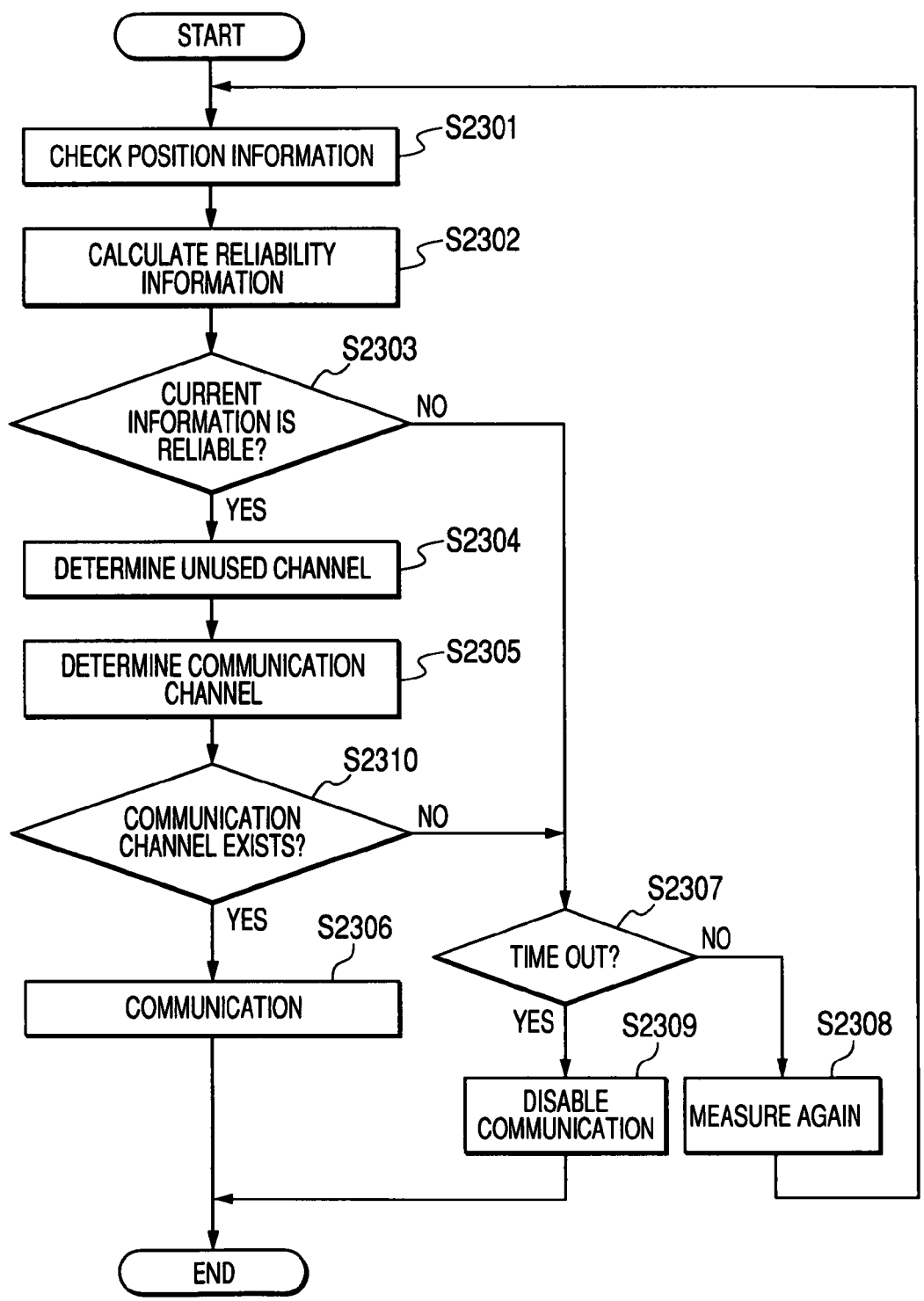
FIG. 23 is a process flow chart of the whole system for starting communication by using database information.

FIG. 23 is a process flow chart of the whole system for starting communication by using DB information. An AP which receives a communication start request from an ST checks position information of an apparatus which performs communication (step S2301). Thereafter, the reliability is calculated by using information registered in the DB of the AP (step S2302). If it is determined that current information is reliable (step S2303), unused channels in an apparatus which performs communication are determined by using the information (step S2304), and a communication channel is selected from the unused channels (step S2305). If a communication channel exists (step S2310), this is notified to the ST. The ST which receives the notification starts communication by using the notified channel (step S2306).

If reliable information does not exist (the determination in step S2303 is No), or if an unused channel exists but it is determined that a communication channel does not exist (the determination in step S2310 is No), it is determined whether the time is out or not (step S2307). If it is determined that the time is not out (the determination in step S2307 is No), the channel use-state detection is measured (step S2308), and the process is restarted from the checking of position information (step S2301). If it is determined that the time is out (the determination in step S2307 is Yes), it is determined that communication is disabled (step S2309), and this is notified to the user or the high-level layer. As an index of the time-out, the number or time of remeasurements may be used.

Figure 24:
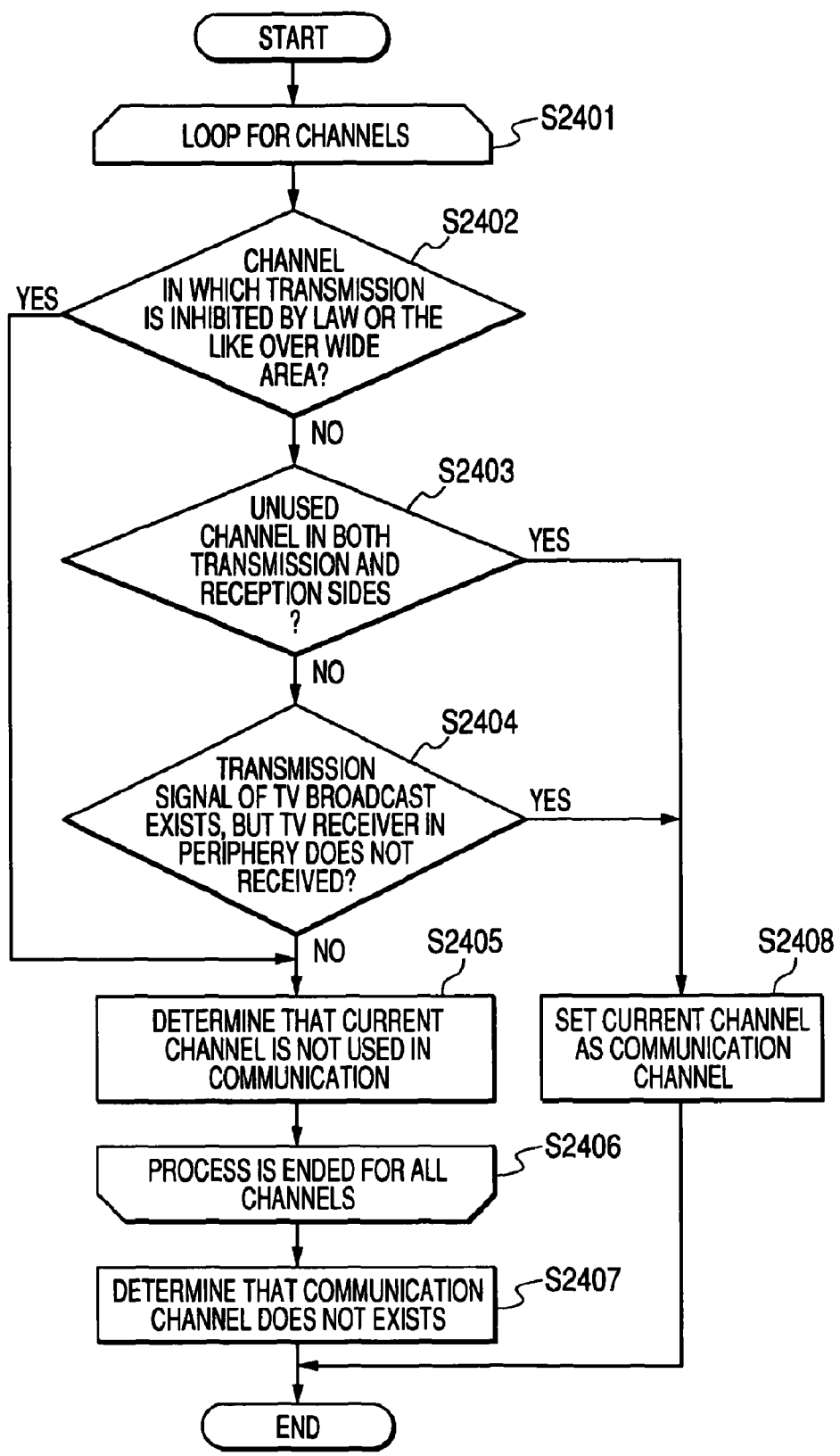
FIG. 24 is a detailed flowchart of the process of communication channel determination in FIG. 23.

FIG. 24 is a detailed flowchart of the process of the communication channel determination (step S2305) in FIG. 23. In the communication channel determination process, one channel is selected from candidates of a channel which performs communication, and it is judged whether the channel can be determined as a communication channel. First, one cannel is selected (step S2401), and it is determined whether the channel is a channel in which radio transmission is inhibited by the law of the country, or that which is used by an apparatus that is very susceptible to interference, such as radio astronomy, and in which transmission is inhibited (step S2402). If the channel is a channel in which transmission is inhibited, it is immediately determined that the channel is not used as a communication channel (step S2405), and the process is transferred to the next candidate channel (step S2406). By contrast, if the channel is not a channel in which transmission is inhibited, it is determined whether the channel is an unused channel in an apparatus which performs communication or not (step S2403). Here, it is determined whether the channel is an unused channel in the STs 226, 227 or not. In the example of FIG. 16, it is determined in S404 that the channel of f07 MHz is an unused channel in the STs 226, 227, and hence the condition of step S2403 is Yes. In this case, the channel of f07 MHz is set as a communication channel (step S2408). If a common channel does not exist and the determination of step S2403 is No, it is further determined whether, for the channel, communication that is used on the transmission side but not used on the reception side exists or not (step S2404). In this example, it is determined whether, for a TV broadcast, the channel is a channel in which the broadcast station 201 performs transmission and the TVs 214, 224 connected with the TV receiving antennas 213, 223 existing in the periphery do not perform reception or not.

The determination of "periphery" is conducted by using above-described Expression (2) depending on whether transmission signals of the STs 226, 227 interfere with the TV receiving antennas 213, 223 or not. If the position, antenna directionality, and transmission power by which interference is suppressed to the noise level or lower are attained, the determination of S1004 is Yes. In this case, the channel is set as a communication channel (step S2408). If interference cannot be suppressed to the noise level or lower, it is determined that the channel cannot be set as a communication channel (step S2405), and the process is transferred to the next candidate channel (step S2406). The determination is conducted on all channels (step S2406). If a communication channel is not determined, it is determined that a communication channel does not exist (step S2407).

Figure 25:
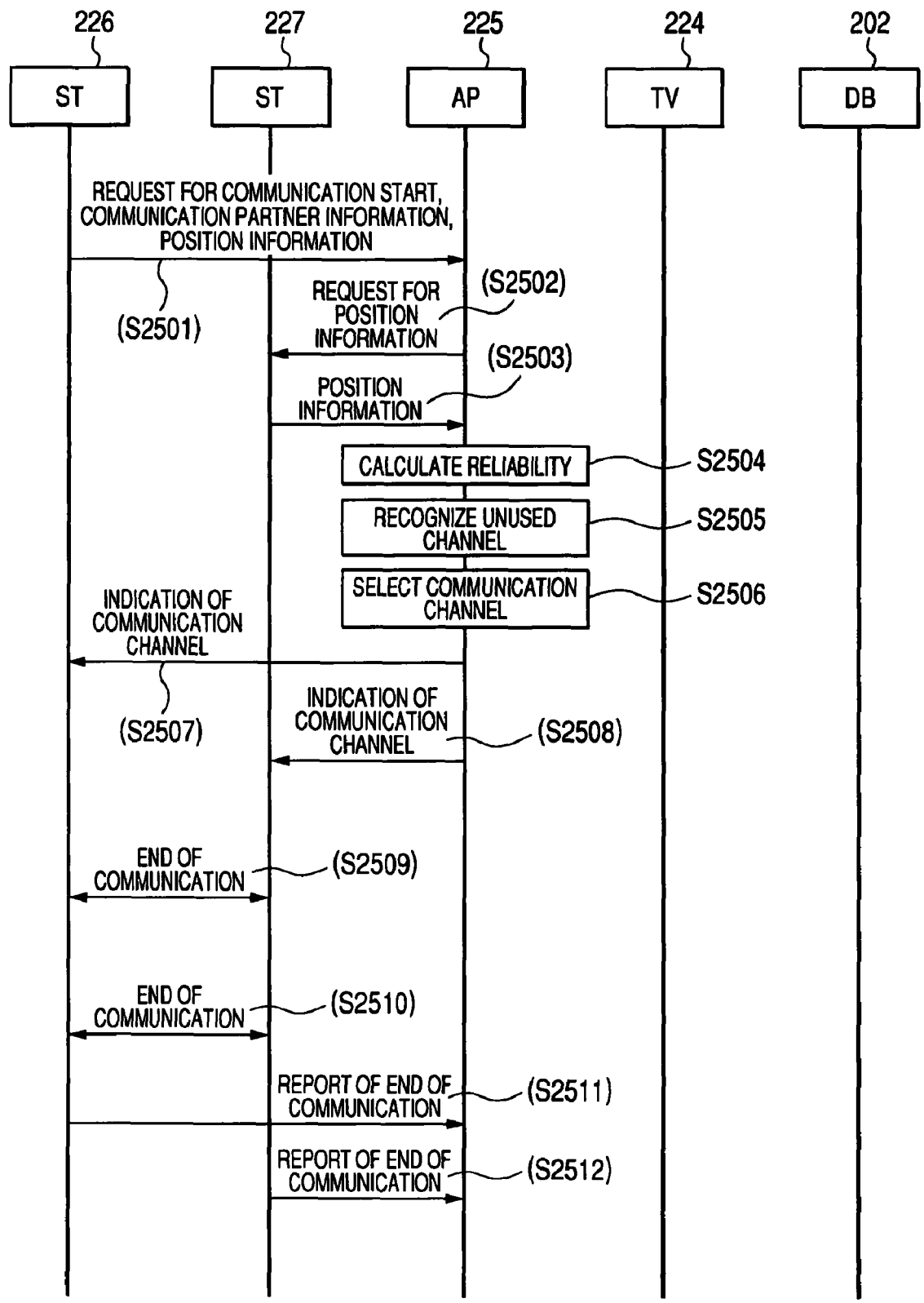
FIG. 25 is a sequence diagram relating to message exchanges occurring in communication using database information.

FIG. 25 is a sequence diagram relating to message exchanges occurring in communication using DB information. The figure shows the case where the STs 226, 227 communicate with each other in the ad-hoc mode. In the case where a request for starting communication is generated in the ST 226, the ST 226 transmits a communication start request message to the AP 225 (step S2501). At this time, in the case where the ST wishes to communicate with another ST in the ad-hoc mode, the message includes information such as the identification number of the communication partner. In the case of FIG. 25, there is a request for communicating with the ST 227, and hence the identification number of the ST 227 is notified to the AP 225. It is assumed that identification information such as the identification number of STs which are under control of the AP 225 is previously known at the establishment of the network (at power ON or the like) or through periodical updation. At the same time, also position information of the ST 226 is notified to the AP 225. When these sets of information are to be notified to the AP 225, communication may be performed by using a predetermined channel dedicated to notification, or a channel for notifying the information may be previously transmitted to the AP 225 by using a predetermined channel dedicated to control. Alternatively, interference may be previously measured, and then the information may be notified by using an arbitrary channel in which interference does not exist.

The AP 225 which receives the request of the ST 226 for communicating with the ST 227 first issues a position information request in order to check the position of the ST 227, to the ST 227 (step S2502). The ST 227 notifies the AP 225 of information of the position (position information) where the ST 227 currently exists (step S2503). Thereafter, the AP 225 requests the DB 202 having interference information of the area to send a channel use-state. In response to the request, the DB 202 provides latest information.

The AP 225 calculates the reliability of information by using position information of the ST 226, position information of the ST 227, information obtained from the DB 202, information of the DB in the AP 225, and the like (step S2504). An example of calculation of the reliability of information of the channel of f07 MHz in the ST 226 will be p described with reference to FIG. 16. Information which is in the AP 225, and which relates to the channel of f07 MHz is information (16A) measured in the ST 226 and information (16B) measured in the ST 227. By using these sets of information, the reliability of information in the channel of f07 MHz in the ST 226 is calculated. When the current time is set to 12:21:52.20 and the distance between the STs 226, 227 is set to 5 m, following Expression (7) is obtained.

$$R_{ST226, f07 MHz} = \sum_{m=0}^{M-1} \left[ \frac{1}{\tau_{now} - \tau_m} \times Lp(L_{ST226} - L_m) \right]$$ Expression (7)

$$= \left[ \frac{1}{4.00 \text{ [sec]}} \times Lp(0 \text{ [m]}) \right] +$$

$$\left[ \frac{1}{3.00 \text{ [sec]}} \times Lp(10 \text{ [m]}) \right]$$

This is the position of the ST 226. As a result, when the reliability is higher than a threshold, an unused channel is recognized by using these sets of information (step S2505), and, when the reliability is lower than the threshold, a process for enhancing the reliability is performed. In order to enhance the reliability, in this case, the ST 226 may again measure the channel use-state. Alternatively, in the case such as that the ST 226 is an ST which cannot measure a channel use-state, a channel use-state measuring apparatus which is situated as close as possible may be caused to measure a channel use-state.

It is assumed that determination on an unused channel is conducted by using a reception power of −50 dBm in the example of FIG. 16. For the ST 226, the channels of f02 MHz and f07 MHz are unused channels, and, for the ST 227, the channel of f07 MHz is an unused channel.

Thereafter, the AP 225 selects and determines the communication band (communication channel) by a method described with reference to FIG. 24 by using position information of the ST 226, position information of the ST 227, information obtained from the DB 202 (step S2506).

When the communication band is determined, it is notified to the STs 226, 227 (steps S2507, S2508). The STs 226, 227 perform a desired communication by using the notified communication band (step S2509). For example, the ST 226 transmits a preamble by using the notified channel, and the ST 227 receives the preamble transmitted by the ST 226 and returns an ACK. Upon receiving the ACK, the ST 226 starts transmittance of data to be transmitted. In the AP 225, at this time, the phenomenon that the STs 226, 227 are communicating with each other is registered in the DB. The AP 225 knows the channel which is being used in communication. When a request for performing communication is newly generated, therefore, it is possible to prevent the communication between the STs 226, 227 from being disturbed.

When the communication is ended (step S2510), the STs 226, 227 notify the AP 225 of the end of communication (steps S2511, S2512). In the AP 225, the information indicating that the STs 226, 227 are communicating with each other is deleted from the DB, and the channel is opened to other communication.

As described above, an ST of a wireless LAN is caused to detect a channel use-state, an unused channel is determined by using a reliability, reception information of a TV and information in a local server are obtained to determine a communication band, and an AP designates a channel used for an ST, whereby communications between ST-AP and ST-ST are enabled by using a time zone in which a TV broadcast is not performed, a frequency band and place in which a peripheral TV does not perform reception, and a frequency band and place in which other STs do not perform reception. Therefore, the frequency use efficiency is remarkably improved as compared with a method in which a frequency is allocated to each system.

Fourth Embodiment

Next, a fourth embodiment of the invention will be described. The embodiment is an example in the case where a cellular radio system performs communication by using a frequency band of a radar or radio astronomy.

Figure 26:
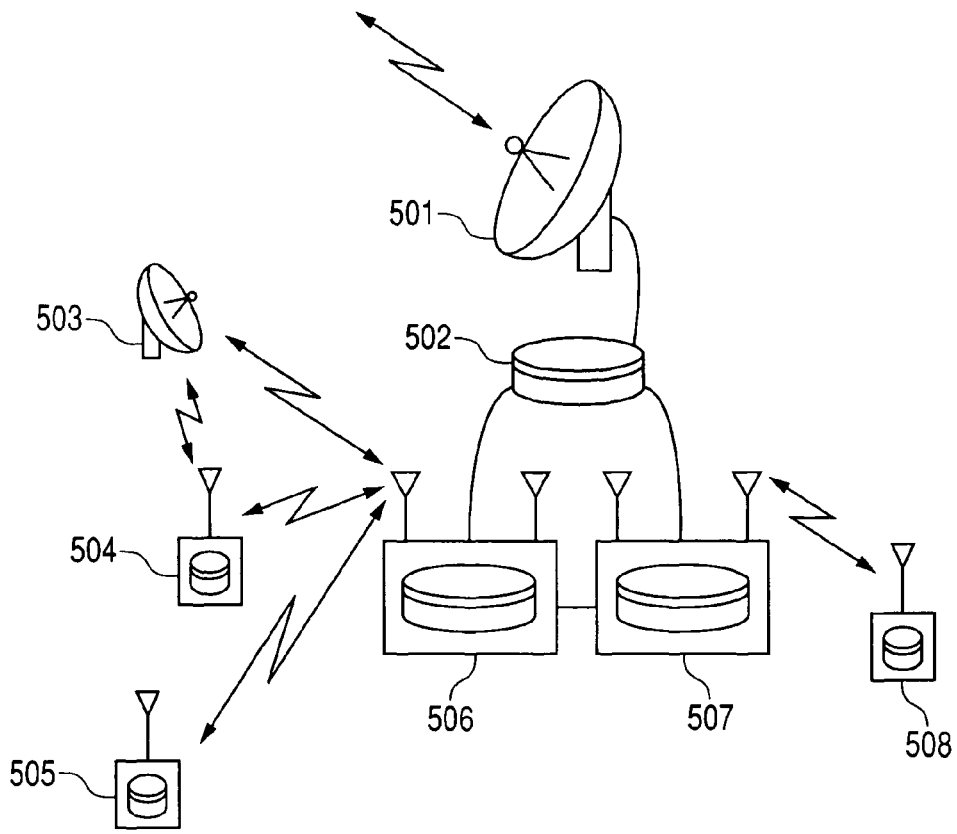
FIG. 26 is a diagram showing an example of the system configuration of a fourth embodiment of the invention.

FIG. 26 is a diagram showing an example of the system configuration of the embodiment. A radio astronomy receiver 501 and a local DB 502 can exchange information about the current wireless-channel use-state by wire or wireless. Each of base stations 506, 507 has a database (DB) for a wireless-channel use-state, and the base stations can exchange information through the local DB 502. Terminals 504, 505 are under control of the base station 506, and a terminal 508 is under control of the base station 507. Each of the terminals also has a wireless-channel use-state database. The terminals communicate by wireless with the respective base stations which control the terminals, and the base stations communicate with each other by wire. When two of the terminals communicate with each other, the communication is performed through one of the base stations. It is assumed that a radar 503 transmits a signal to the periphery, and gives interference to the positions of the base station 506 and the terminal 504, or in a wireless channel.

The base station 506 is configured in a substantially same manner as the AP 225 in above-described third embodiment except that the TV input IF is not disposed.

Figure 27:
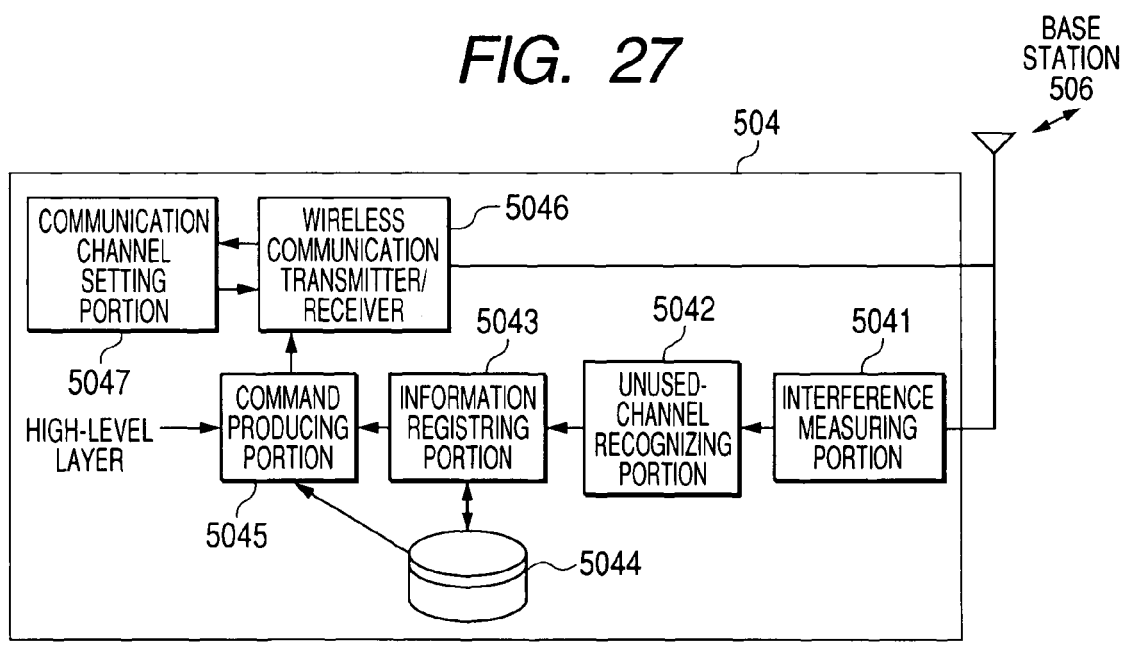
FIG. 27 is a diagram schematically showing the configuration of a terminal.

FIG. 27 is a diagram schematically showing the configuration of the terminal 504. The terminal 504 of FIG. 27 comprises: an interference measuring portion 5041 which scans wireless channels of a usable frequency band to measure interference; an unused-channel recognizing portion 5042 which recognizes an unused wireless channel on the basis of a result of the scan of wireless channels in the interference measuring portion 5041; an information registering portion 5043 which registers information of the unused channel recognized by the unused-channel recognizing portion 5042, into a database 5044; a communication channel setting portion 5047 which sets a communication channel on the basis of information received from the database 5044 and relating to a wireless channel in an unused (not used) state; a wireless communication transmitting/receiving portion 5046 which modulates a signal to be transmitted through the set communication channel, and which demodulates a received signal; and a command producing portion 5045 which produces various commands on the basis of instructions from a high-level layer.

FIG. 28 is a view showing an example of wireless-channel use-state information in the database 5044 which stores the wireless-channel use-state of the terminal 504. The terminal 504 measures interference at position Nx01, Ey01 in f01 MHz, f02 MHz, f03 MHz, and f04 MHz that are candidates of a wireless channel in which communication is to be performed, and records a result of the measurement into the DB. In the example of FIG. 28, interference is not measured in f01 MHz, f02 MHz, and f03 MHz, and interference is measured in f04 MHz. The use-state of radio astronomy is notified from the base station 506.

FIG. 29 is a view showing an example of wireless-channel use-state information stored in the wireless-channel use-state DB of the terminal 505. In the same manner as the terminal 504, interference is measured at position Nx02, Ey02 in f01 MHz, f02 MHz, f03 MHz, and f04 MHz, and a result of the measurement is recorded into the DB. Here, interference is not measured in all of the measured wireless channels. The use-state of radio astronomy is notified from the base station 506.

FIG. 30 is a view showing an example of wireless-channel use-state information stored in the wireless-channel use-state DB of the base station 506. In this example, the measurement results notified from the terminals 504, 505, and a use-state of the radio astronomy 501 notified from the DB 502 are recorded.

FIG. 31 shows an example of the wireless-channel use-state information stored in the local DB 502. In the example, when the radio astronomy 501 starts the measurement, the frequency band and the use-state are notified to the DB 502. Also information notified from the connected base stations 506, 507 is recorded.

FIG. 32 is a flowchart in the case where a terminal notifies a base station of a wireless-channel use-state. It is assumed that the terminal periodically measures the wireless-channel use-state. When a fixed time period (for example, 1.0 second) has elapsed, the terminal measures the wireless-channel use-state. First, the wireless-channel use-state of a region which is determined as an unused region in the previous measurement is measured (step S3201). At this time, if it is determined that interference exists in the measured wireless channel (the result of the determination in step S3202 is Yes), the DB in the terminal is updated, and the base station is notified that the wireless-channel use-state is changed (step S3203). The notified base station updates information of its own DB. The determination whether interference exists or not is performed depending on whether the reception power of the measured wireless channel is equal to lower than a threshold or not. The threshold is a preset value in the system, and, for example, a power of −60 dBm. If the reception power in the measured wireless channel is higher than the threshold, it is determined that a signal transmitted from any apparatus exists as interference in the wireless channel in addition to thermal noise.

After the measurement for the unused region is ended, a wireless channel in which it is determined in the previous measurement that interference exists is measured (step S3204) If it is determined that interference does not exist in the measured wireless channel (the result of the determination in step S3205 is Yes), the DB in the terminal is updated, and the base station is notified that the wireless-channel use-state is changed (step S3206). Similarly, the notified base station updates information of its own DB.

Figure 33:
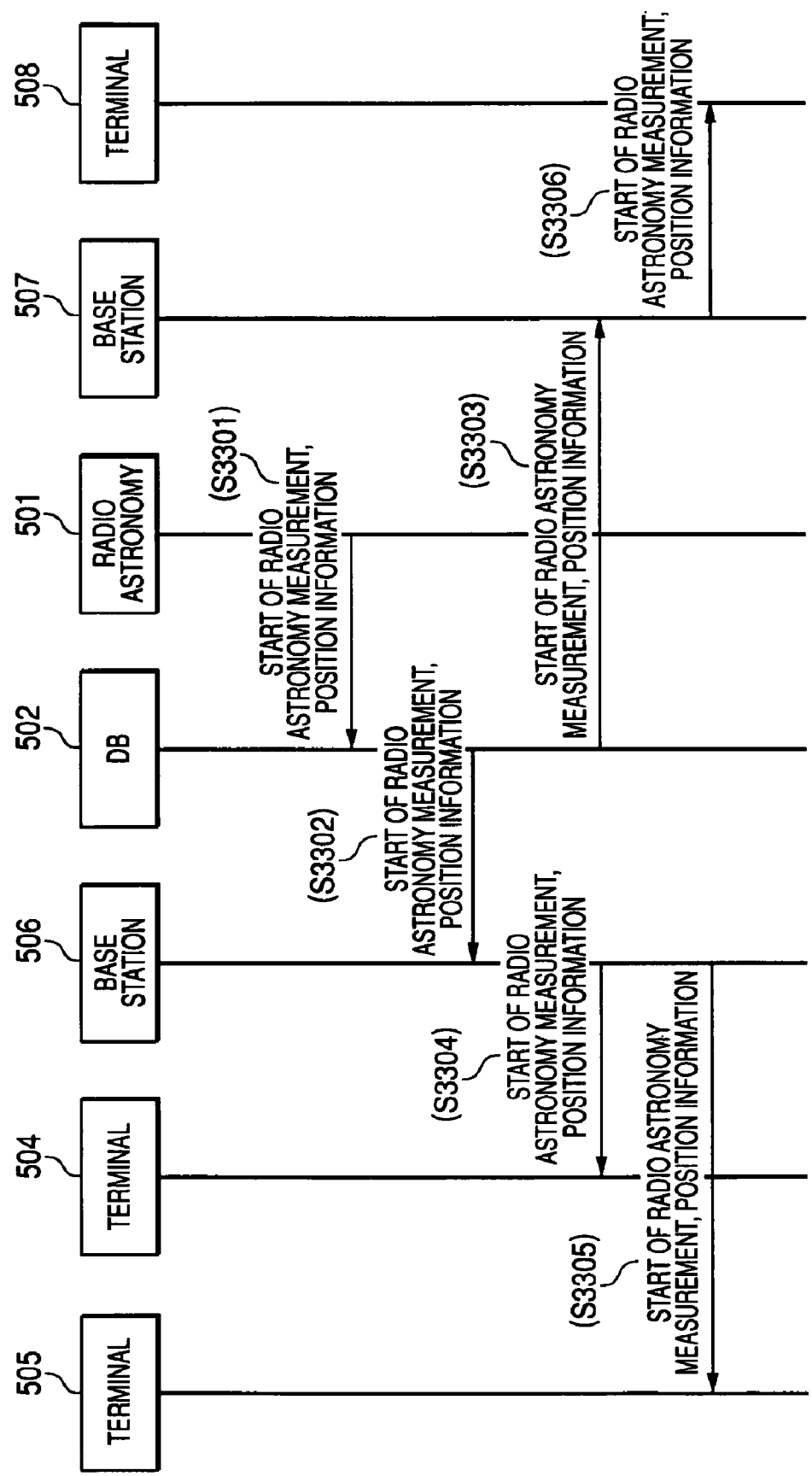
FIG. 33 is a sequence diagram showing message exchanges occurring when a radio astronomy starts a measurement.

FIG. 33 is a sequence diagram showing message exchanges occurring when the radio astronomy 501 starts the measurement. Hereinafter, message exchanges will be described with reference to FIG. 33.

Immediately before the radio astronomy 501 starts the measurement, the radio astronomy 501 notifies the DB 502 of the start of measurement, and position information of the radio astronomy 501 (step S3301). When the DB 502 receives a message that the radio astronomy 501 starts the measurement, the DB notifies the base stations 506, 507 of the area under control of the DB 502, of the information at the highest priority (steps S3302, S3303).

The base stations 506, 507 notify the terminals 505, 504, 508 under control of the stations of the information (steps S3304, S3305, S3306). In a terminal receiving the notification that the radio astronomy starts the measurement, even when interference does not exist in the wireless channel, the wireless channel is registered as an unusable wireless channel. When the radio astronomy stops the measurement, a message that the wireless channel is opened is notified to the terminals, and the wireless channel is again allowed to be used.

Figure 34:
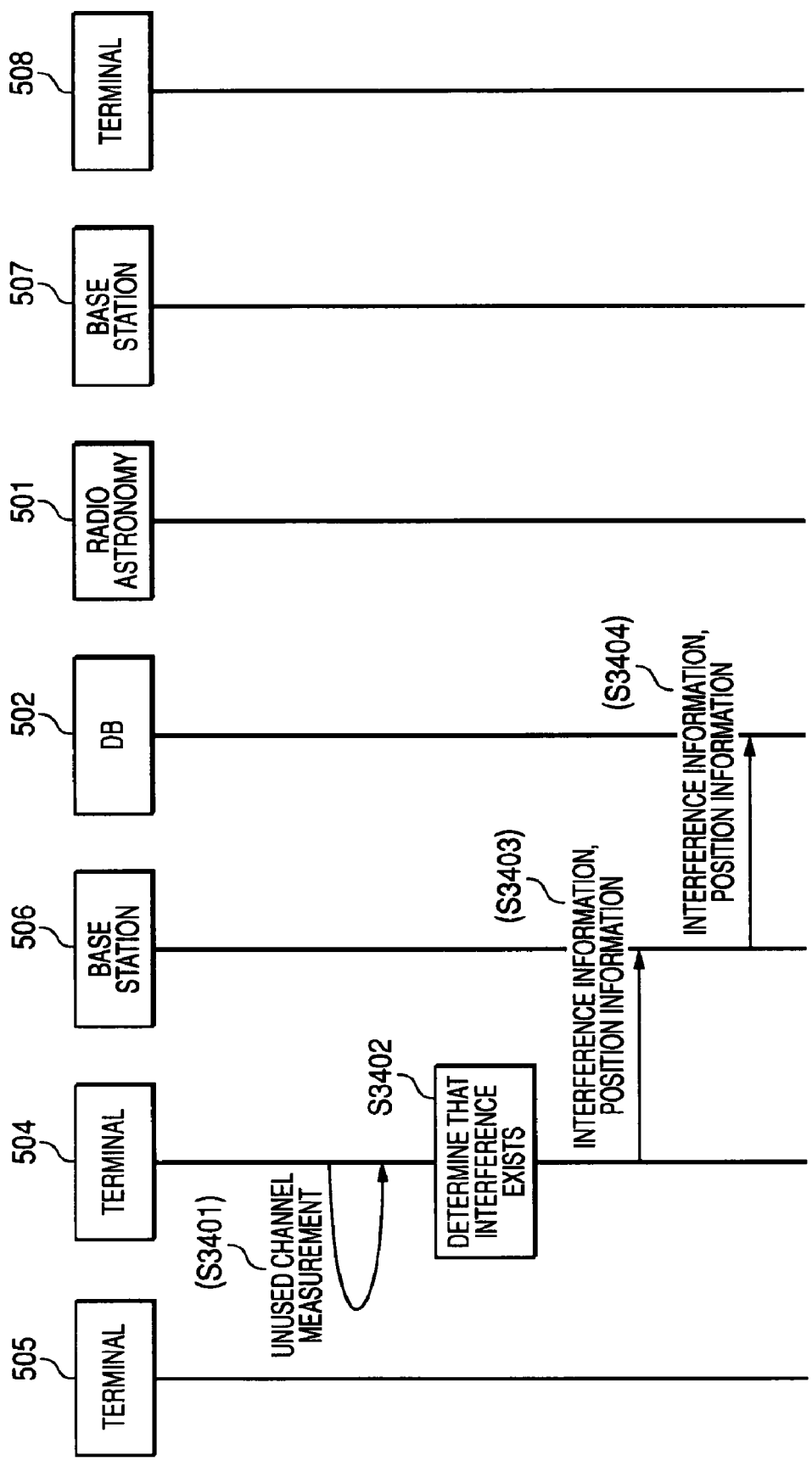
FIG. 34 is a sequence diagram showing an example of message exchanges in the case where determination that interference exists as a result of the measurement of a wireless-channel use-state by the terminal is notified.

FIG. 34 is a sequence diagram showing an example of message exchanges in the case where determination that interference exists as a result of the measurement of a wireless-channel use-state by the terminal 504 is notified. Hereinafter, message exchanges will be described with reference to FIG. 34.

In the case where the terminal 504 determines in the present measurement that, in a wireless channel which is determined as an unused wireless channel in the previous measurement (step S3401), interference exists (step S3402), the terminal 504 notifies the base station 506 which controls the terminal 504, of information of the position where the terminal 504 exists, and that of interference of the measured wireless channel (step S3403). The base station 506 to which the information is notified determines that the wireless-channel use-state in a terminal under control is changed, and notifies the information to the local wireless-channel use-state DB 502 (step S3404). The notification of information is performed by wireless. The terminal 504 performs notification on the base station 506 by using a predetermined notification wireless channel. The notification wireless channel is used only in notification of wireless-channel use-state information. For other user data, from a result of recognition, communication is performed by using a wireless channel other than the notification wireless channel. The notification wireless channel is a dedicated wireless channel allocated to the cognitive system, and cannot be used by another system.

Figure 35:
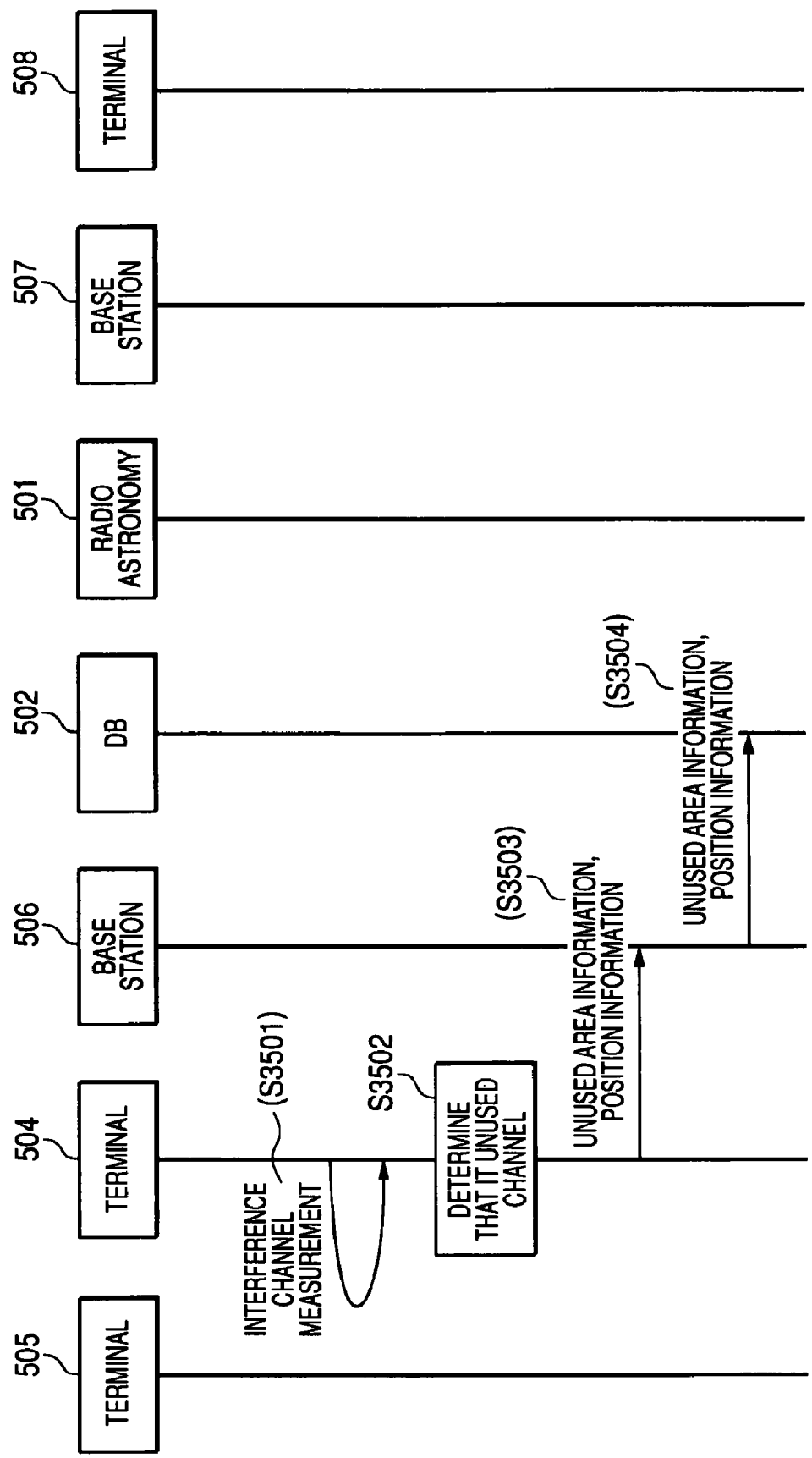
FIG. 35 is a sequence diagram showing an example of message exchanges in the case where determination that interference does not exist as a result of the measurement of a wireless-channel use-state by the terminal is notified.

FIG. 35 is a sequence diagram showing an example of message exchanges in the case where determination that interference does not exist as a result of the measurement of a wireless-channel use-state by the terminal 504 is notified. Hereinafter, message exchanges will be described with reference to FIG. 35.

In the case where the terminal 504 determines in the present measurement that, in a wireless channel which is determined as a wireless channel in which interference exists in the previous measurement (step S3501), interference does not exist (step S3502), the terminal 504 notifies the base station 506 which controls the terminal 504, of information of the position where the terminal 504 exists, and that of an unused wireless channel of the measured wireless channels (step S3503). The base station 506 to which the information is notified determines that the wireless-channel use-state in a terminal under control is changed, and notifies the information to the local wireless-channel use-state DB 502 (step S3504).

Figure 36:
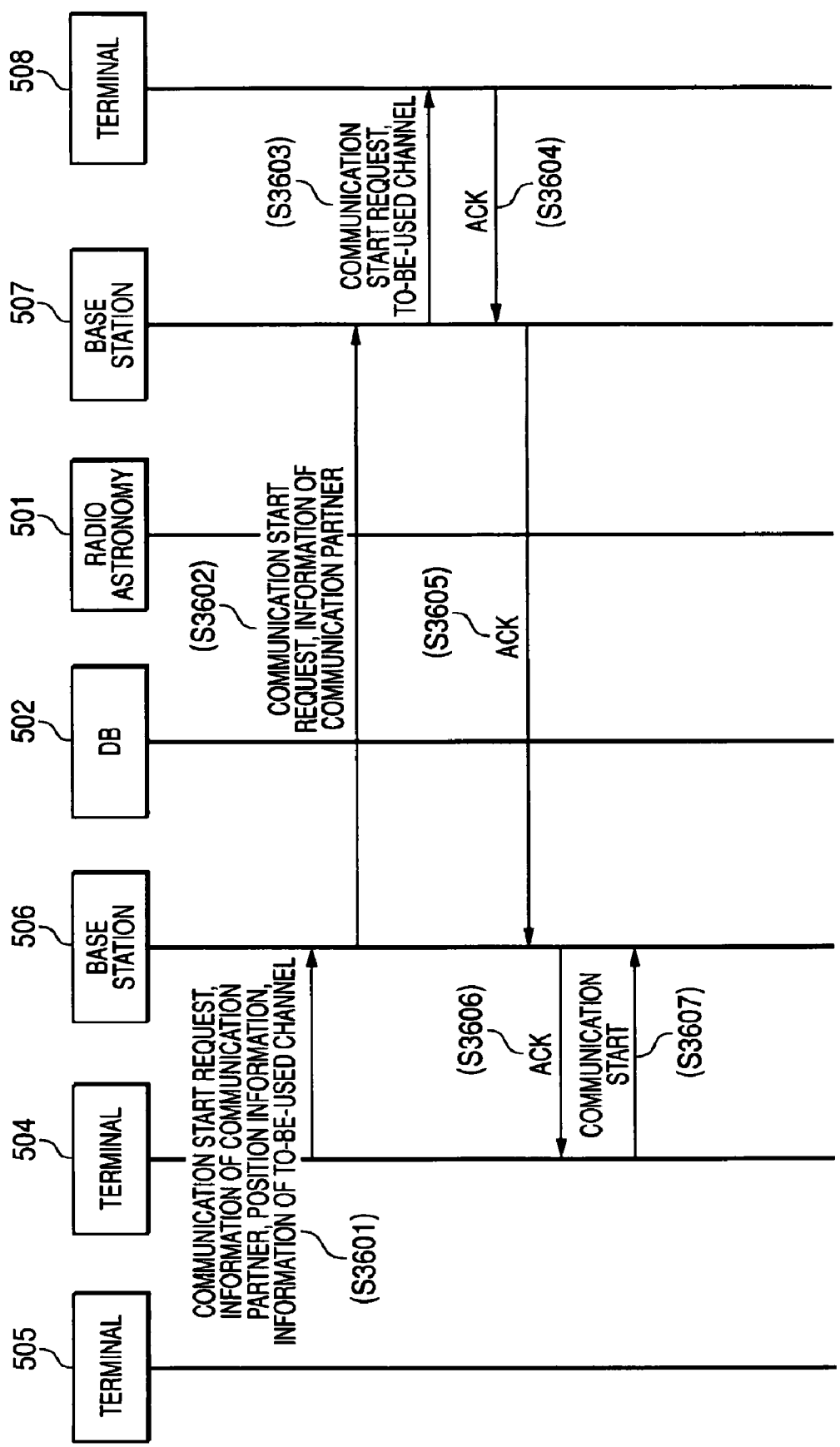
FIG. 36 is a sequence diagram showing an example of message exchanges in the case where the terminal starts communication.

FIG. 36 is a sequence diagram showing an example of message exchanges in the case where the terminal 504 starts communication. Hereinafter, the message exchange will be described with reference to FIG. 36.

The terminal 504 transmits a message requesting communication with the terminal 508 to the base station 506 which controls the terminal 504 (step S3601). The message is transmitted by using a fixed control wireless channel. At this time, simultaneously with a communication start request, also identification information of the communication partner, position information of the terminal 504, and information of the wireless channel to be used are notified.

The base station 506 notifies the base station 507 which controls the terminal 508, of the communication start request and the identification information of the communication partner (step S3602). The base station 507 notifies the terminal 508 of the communication start request and the wireless channel to be used (step S3603). At this time, the to-be-used wireless channel which is notified from the base station 507 to the terminal 508 is different from that of the terminal 504 and the base station 506. When the pairs are spatially sufficiently separated from each other, the same wireless channel may be used. When the to-be-used wireless channel which is notified from the base station 507 to the terminal 508 is usable, the terminal returns an ACK. The base station 507 which receives the ACK notification from the terminal 508 returns an ACK to the base station 506 (step S3605), and the base station 506 returns an ACK to the terminal 504 (step S3606). After these procedures, the terminal 504 communicates with the terminal 508 by way of the base stations 506, 507 (step S3607).

FIG. 37 is a sequence diagram showing an example of message exchanges in the case where the terminal 505 starts communication. Hereinafter, the message exchange will be described with reference to FIG. 37.

The terminal 505 transmits a message requesting communication with the terminal 508 to the base station 506 which controls the terminal 505 (step S3701). The message is transmitted by using the fixed control wireless channel. At this time, simultaneously with the communication start request, also identification information of the communication partner, position information of the terminal 505, and information of the wireless channel to be used are notified. The base station 506 notifies the base station 507 which controls the terminal 508, of the communication start request and the identification information of the communication partner (step S3702). The base station 507 notifies the terminal 508 of the communication start request and the wireless channel to be used (step S3703). If the to-be-used wireless channel which is notified from the base station 507 to the terminal 505 can be used, an ACK is returned (step S3704) The base station 507 which receives the notification of the ACK from the terminal 508 returns the ACK to the base station 506 (step S3705). If the base station 506 determines that the to-be-used wireless channel which is notified from the terminal 505 cannot be used because of a reason such as that inference exists, the base station 506 notifies the terminal 505 that the designated wireless channel cannot be used, in parallel with the message exchange with the base station 507 (step S3706). At this time, also the reason of this is simultaneously notified. It is assumed that a signal of the radar 503 which cannot be measured as interference in the terminal 505 functions as interference to the base station 506 and is not determined as an unused wireless channel. The determination whether interference exists in the wireless channel designated by the base station 506 or not may be conducted by using a result of an interference measurement performed by the terminal 504 in the vicinity of the base station 506 on the basis of position information, or alternatively by using result of an interference measurement performed by the base station 506 itself. For the reason of the unusable state, for example, triangulation may be performed by using measurement information of the terminal 504 and estimated information of the arrival direction of interference, and measurement information of the base station 506 and estimated information of the arrival direction of interference, the position of the radar 503 which is an interference source may be identified, and the position may be notified to the terminal 505. In this case, the terminal 505 and the base station 506 perform communication while the beam directions of transmission signals are directed to each other, or the null direction is directed to the direction of the radar 503, whereby interference by the radar 503 can be avoided from occurring. By such a method, the terminal 505 again notifies the base station 506 of the to-be-used wireless channel (step S3707), and the base station 506 checks that the wireless channel designated by the terminal 505 is a usable wireless channel, and the ACK is returned from the base station 507, and thereafter returns an ACK to the terminal 505 (step S3708). After these procedures, the terminal 505 communicates with the terminal 508 by way of the base stations 506, 507 (step S3709).

As described above, terminals and base stations of a cellular radio system measure a wireless-channel use-state to obtain use-states of radio astronomy and a radar, and information of a local server, whereby a time zone, frequency band, and place where interference does not exist are recognized, and communication can be performed by using these wireless channels. Therefore, the frequency use efficiency is remarkably improved as compared with a method in which a frequency is allocated to each system.

Although the embodiments of the invention have been described, the invention is not restricted to the embodiments as they are, and, in an implementation phase, may be embodied while modifying components without departing from the spirit of the invention. Furthermore, various inventions can be formed by adequately combining plural components disclosed in the embodiments. For example, several components may be deleted from all components shown in the embodiments, and components extending over different embodiments may be adequately combined with one another.

What is claimed is:

1. A cognitive radio system comprising:
a plurality of terminal devices operable to communicate with one another;
a state detecting device that scans a frequency band allocated to a first radio system to detect a first use-state of the frequency band;
a first server comprising:
   a first gathering unit that receives first information relating to the first use-state from the state detecting device; and
   a second gathering unit;
a second server that stores a second use-state of a frequency band allocated to a second radio system, the second server configured to provide second information relating to the second use-state to the second gathering unit; and
a notifying unit that notifies a first terminal device of the plurality of terminal devices of information of an available channel to communicate with a second terminal device of the terminal devices based on a comparison of the first information and the second information;
wherein the first server calculates a reliability of received information received by the first server; wherein the first server calculates the reliability so that the reliability is made higher as a distance between the position of the first terminal device and the position of the second terminal device is shorter; and
wherein the calculation is determined by $$R_n = \sum_{m=0}^{M} \left[ G(L_n - L_m) \times \left( \frac{1}{\tau_{now} - \tau_m} \right) \times L_p(|L_n - L_m|) \right]$$

where $G(L_n-L_m)$ is an antenna gain with respect to a direction $(L_n-L_m)$, $L_p(|L_n-L_m|)$ is a propagation loss with respect to a distance $|L_n-L_m|$, and wherein n:terminal; m:detecting device; M:number of detecting devices; $L_m$:position of detecting devices; $L_n$:position of a terminal; $\tau_m$:time on which $P_{m,f,t,c}$ is measured; and $\tau_{now}$:time on which $R_n$ is calculated.

2. A cognitive radio system comprising:
a plurality of terminal devices operable to communicate with one another;
a state detecting device that scans a frequency band allocated to a first radio system to detect a first use-state of the frequency band;
a first server comprising:
   a first gathering unit that receives first information relating to the first use-state from the state detecting device; and
   a second gathering unit;
a second server that stores a second use-state of a frequency band allocated to a second radio system, the second server configured to provide second information relating to the second use-state to the second gathering unit; and
a notifying unit that notifies a first terminal device of the plurality of terminal devices of information of an available channel to communicate with a second terminal device of the terminal devices based on a comparison of the first information and the second information;
wherein the first server calculates a reliability of received information received by the first server; wherein the first server calculates the reliability so that the reliability is made higher as a distance between the position of the first terminal device and the position of the second terminal device is shorter; and
wherein the calculation is determined by $$R_n = \sum_{m=0}^{M} \left[ S_m \times \left( \frac{1}{\tau_{now} - \tau_m} \right) \right]$$

where Sm is an interference measurement accuracy of the state detecting device; and wherein m:detecting device; M:number of detecting devices; $\tau_m$:time on which $P_{m,f,t,c}$ is measured; and $\tau_{now}$:time on which $R_n$ is calculated.

\* \* \* \* \*